US012112538B2

(12) United States Patent
Arnab et al.

(10) Patent No.: US 12,112,538 B2
(45) Date of Patent: Oct. 8, 2024

(54) SYSTEMS AND METHODS FOR IMPROVED VIDEO UNDERSTANDING

(71) Applicant: Google LLC, Mountain View, CA (US)

(72) Inventors: Anurag Arnab, Grenoble (FR);
Mostafa Dehghani, Amsterdam (NL);
Georg Heigold, Aachen (DE); Chen Sun, San Francisco, CA (US); Mario Lucic, Adliswil (CH); Cordelia Luise Schmid, Saint-Ismier (FR)

(73) Assignee: GOOGLE LLC, Mountain View, CA (US)

( * ) Notice: Subject to any disclaimer, the term of this patent is extended or adjusted under 35 U.S.C. 154(b) by 616 days.

(21) Appl. No.: 17/370,522

(22) Filed: Jul. 8, 2021

(65) Prior Publication Data
US 2023/0017072 A1    Jan. 19, 2023

(51) Int. Cl.
*G06V 20/40* (2022.01)
*G06N 20/00* (2019.01)

(52) U.S. Cl.
CPC ............ *G06V 20/41* (2022.01); *G06N 20/00* (2019.01); *G06V 20/46* (2022.01); *G06V 20/49* (2022.01)

(58) Field of Classification Search
CPC ........ G06V 20/41; G06V 20/46; G06V 20/49; G06V 10/82; G06N 20/00; G06N 3/084; G06N 3/0442; G06N 3/0464
See application file for complete search history.

(56) References Cited

U.S. PATENT DOCUMENTS

| | | | |
|---|---|---|---|
| 11,386,900 B2* | 7/2022 | Shillingford | G06N 3/044 |
| 11,409,791 B2* | 8/2022 | Torabi | G06F 16/638 |
| 2021/0141861 A1* | 5/2021 | Kalluri | G06F 40/284 |
| 2021/0174162 A1* | 6/2021 | Le | G06V 10/764 |
| 2022/0253633 A1* | 8/2022 | Bertasius | G06V 10/56 |
| 2023/0017072 A1* | 1/2023 | Arnab | G06V 20/49 |
| 2023/0046066 A1* | 2/2023 | Bulat | G06V 10/7715 |

(Continued)

FOREIGN PATENT DOCUMENTS

| | | | |
|---|---|---|---|
| CN | 115131698 A | * | 9/2022 |
| CN | 115187910 A | * | 10/2022 |

(Continued)

OTHER PUBLICATIONS

Aranab et al., "ViViT: A Video Vision Transformer", arXiv:2103.15691v1, Mar. 29, 2021, 13 pages.

(Continued)

*Primary Examiner* — Wesley J Tucker
(74) *Attorney, Agent, or Firm* — DORITY & MANNING P.A.

(57) ABSTRACT

A computer-implemented method for classifying video data with improved accuracy includes obtaining, by a computing system comprising one or more computing devices, video data comprising a plurality of video frames; extracting, by the computing system, a plurality of video tokens from the video data, the plurality of video tokens comprising a representation of spatiotemporal information in the video data; providing, by the computing system, the plurality of video tokens as input to a video understanding model, the video understanding model comprising a video transformer encoder model; and receiving, by the computing system, a classification output from the video understanding model.

16 Claims, 10 Drawing Sheets

(56) References Cited

U.S. PATENT DOCUMENTS

| | | | | |
|---|---|---|---|---|
| 2023/0090941 A1* | 3/2023 | Li | ............................ | G06V 20/40 |
| | | | | 382/157 |
| 2023/0136515 A1* | 5/2023 | Wu | ......................... | G06N 5/022 |
| | | | | 382/157 |
| 2023/0281246 A1* | 9/2023 | Lee | ....................... | G06F 16/732 |
| | | | | 382/305 |
| 2023/0306056 A1* | 9/2023 | Lee | ....................... | G06F 16/783 |
| 2023/0401824 A1* | 12/2023 | Khan | ...................... | G06V 20/70 |

FOREIGN PATENT DOCUMENTS

| | | | | | |
|---|---|---|---|---|---|
| CN | 115205736 A | * | 10/2022 | | |
| CN | 111523421 B | * | 5/2023 | ......... | G06K 9/00369 |
| CN | 116129330 A | * | 5/2023 | ............... | G06N 3/08 |

OTHER PUBLICATIONS

Ba et al., "Layer Normalization", arXiv:1607.06450v1, Jul. 21, 2016, 14 pages.

Bertasius, et al., "Is Space-Time Attention All You Need for Video Understanding?", arXiv:2102.05095v4, Jun. 9, 2021, 13 pages.

Brown et al., "Language Models for Few-Shot Learners", Conference on Neural Information Processing Systems, Dec. 6-12, 2020, Vancouver, Canada, 25 pages.

Cao et al., "GCNet: Non-local Networks Meet Squeeze-Excitation Networks and Beyond", Conference on Computer Vision and Pattern Recognition, Jun. 16-20, 2019, Long Beach, CA, 10 pages.

Carion et al., "End-to-End Object Detection with Transformers", European Conference on Computer Vision, Aug. 23-28, 2020, Glasgow, UK, 17 pages.

Carreira et al., "Quo Vadis, Action Recognition? A New Model and the Kineteics Dataset", IEEE Conference on Computer Vision and Pattern Recognition, Jul. 21-26, 2017, pp. 4724-4733.

Chen et al., "A2-Nets: Double Attention Networks", Conference on Neural Information Processing Systems, Dec. 3-8, 2018, Montreal, Canada, 10 pages.

Child et al., "Generating Long Sequences with Sparse Transformers", arXiv:1904.10509v1, Apr. 23, 2019, 10 pages.

Choromanski et al., "Rethinking Attention with Performers", arXiv:2009.14794v1, Sep. 30, 2020, 36 pages.

Cubuk et al., "Rand Augment: Practical automated data augmentation with a reduced search space", arXiv:1909.13719v2, Nov. 14, 2019, 13 pages.

Damen et al., "Rescaling Egocentric Vision", arXiv:2006.13256v1, Jun. 23, 2020, 26 pages.

Dehghani et al., "Universal Transformers", International Conference on Learning Representations, May 6-9, 2019, New Orleans, LA, 23 pages.

Deng et al., "ImageNet: A Large-Scale Hierarchical Image Database", Conference on Computer Vision and Pattern Recognition, Jun. 20-25, 2009, Miami, FL, pp. 248-255.

Devlin et al., "BERT: Pre-training of Deep Bidirectional Transformers for Language Understanding", North American Chapter of the Association for Computational Linguistics: Human Language Technologies, Jun. 2-7, 2019, Minneapolis, Minnesota, pp. 4171-4186.

Dosovitskiy et al., "An Image is Worth 16X16 Words: Transformers for Image Recognition at Scale", International Conference on Learning Representations (ICLR), May 3-7, 2021, Virtual, 21 pages.

Fan et al., "More is Less: Learning Efficient Video Representations by Big-Little Network and Depthwise Temporal Aggregation", Conference on Neural Information Processing Systems, Dec. 8-14, 2019, Vancouver, Canada, 10 pages.

Feichtenhofer et al., "SlowFast Networks for Video Recognition", International Conference on Computer Vision, Oct. 27-Nov. 2, 2019, Seoul, Korea, pp. 6202-6211.

Feichtenhofer et al., "Spatiotemporal Residual Networks for Video Action Recognition", Conference on Neural Information Processing Systems, Dec. 5-10, 2016, Barcelona, Spain, 9 pages.

Feichtenhofer, "X3D: Expanding Architectures for Efficient Video Recognition", Conference on Computer Vision and Pattern Recognition, Jun. 14-19, 2020, Virtual, pp. 203-213.

Gidhar et al., "Video Action Transformer Network", IEEE/CVF Conference on Computer Vision and Pattern Recognition, Jun. 16-20, 2019, Long Beach, CA, pp. 244-253.

Girdhar et al., "Attentional Pooling for Action Recognition", Conference on Neural Information Processing Systems, Dec. 4-9, 2017, Long Beach, CA, 12 pages.

Glorot et al., "Understanding the difficulty of training deep feedforward neural networks", International Conference on Artificial Intelligence and Statistics, May 13-15, 2010, Sardinia, Italy, pp. 249-256.

Goyal et al., "The "something something" video database for learning and evaluating visual common sense", International Conference on Computer Vision, Oct. 22-29, 2017, Venice, Italy, pp. 5843-5851.

He et al., "Deep Residual Learning for Image Recognition", Conference on Computer Vision and Pattern Recognition, Jun. 26-Jul. 1, 2016, Las Vegas, NV, pp. 770-778.

Hendrycks et al., Gaussian Error Linear Units (GELUs), arXiv:1606.08415v4, Jul. 8, 2020, 9 pages.

Ho et al., "Axial Attention in Multidimensional Transformers", arXiv:1912.12180v1, Dec. 20, 2019, 11 pages.

Hu et al., "Squeeze-and-Excitation Networks" Conference on Computer Vision and Pattern Recognition, Jun. 18-22, 2018, Salt Lake City, UT, pp. 7132-7141.

Huang et al., "CCNet: Criss-Cross Attention for Semantic Segmentation", International Conference on Computer Vision, Oct. 27-Nov. 2, 2019, Seoul, Korea, pp. 603-612.

Huang et al., "Deep Networks with Stochastic Depth", European Conference on Computer Vision, Oct. 8-16, 2016, Amsterdam, The Netherlands, pp. 646-661.

Jiang et al., "STM: SpatioTemporal and Motion Encoding for Action Recognition", International Conference on Computer Vision, Oct. 27-Nov. 2, 2019, Seoul, Korea, pp. 2000-2009.

Karpathy et al., "Large-scale Video Classification with Convolutional Neural Networks", IEEE Conference on Computer Vision and Pattern Recognition (CVPR), Jun. 23-28, 2014, Columbus, OH, 8 pages.

Kay et al., "The Kinetics Human Action Video Dataset", arXiv:1705.06950v1, May 19, 2017, 22 pages.

Kazakos et al., "EPIC-Fusion: Audio-Visual Temporal Binding for Egocentric Action Recognition", International Conference on Computer Vision, Oct. 27-Nov. 2, 2019, Seoul, Korea, pp. 5491-5500.

Kitaev et al., "Reformer: The Efficient Transformer", International Conference on Learning Representations (ICLR), Apr. 26-30, 2020, Virtual, 12 pages.

Krizhevsky et al., "ImageNet Classification with Deep Convolutional Neural Networks", Conference on Neural Information Processing Systems (NIPS), Dec. 3-8, 2012, Lake Tahoe, NV, 9 pages.

Kuznetsova et al., "The Open Images Dataset V4 Unified Image Classification, Object Detection, and Visual Relationship Detection at Scale", International Journal of Computer Vision, 2020, vol. 128, pp. 1956-1981.

Lan et al., "ALBERT: A Lite BERT for Self-Supervised Learning of Language Representations", International Conference on Learning Representations (ICLR), Apr. 26-May 1, 2020, Virtual, 17 pages.

Laptev, "On Space-Time Interest Points", International Journal of Computer Vision, 2005, vol. 64, pp. 107-123.

Li et al., "TEA: Temporal Excitation and Aggregation for Action Recognition", IEEE/CVF Conference on Computer Vision and Pattern Recognition (CVPR), Conference on Computer Vision and Pattern Recognition, Jun. 14-19, 2020, Virtual, pp. 906-915.

Lin et al., "TSM: Temporal Shift Module for Efficient Video Understanding", International Conference on Computer Vision, Oct. 27-Nov. 2, 2019, Seoul, Korea, pp. 7082-7092.

Mahajan et al., "Exploring the Limits of Weakly Supervised Pretraining", European Conference on Computer Vision, Sep. 8-14, 2018, Munich, Germany, 16 pages.

Monfort et al., "Moments in Time Dataset: One Million Videos for Event Understanding", IEEE Transactions on Pattern Analysis and Machine Intelligence, Feb. 2020, vol. 42, No. 2, pp. 502-508.

(56) References Cited

OTHER PUBLICATIONS

Neimark et al., "Video Transformer Network", arXiv:2102.00719v2, Jul. 25, 2021, 11 pages.
Ng et al., "Beyond Short Snippets: Deep Networks for Video Classification", IEEE Conference on Computer Vision and Pattern Recognition, Jun. 8-12, 2015, Boston, MA, pp. 4694-4702.
Pan et al., "Scalable Vision Transformers with Hierarchical Pooling", arXiv:2103.10619v2, Aug. 18, 2021, 11 pages.
Parmar et al., "Image Transformer", International Conference on Machine Learning Conference, Jul. 10-15, 2018, Stockholm, Sweden, 10 pages.
Price et al., "An Evaluation of Action Recognition Models on EPIC-Kitchens", arXiv:1908.00867v1, Aug. 2, 2019, 6 pages.
Qiu et al., "Learning Spatio-Temporal Representations with Local and Global Diffusion", IEEE/CVF Conference on Computer Vision and Pattern Recognition, Jun. 16-20, 2019, Long Beach, CA, pp. 12048-12057.
Raffel et al., "Exploring the Limits of Transfer Learning with a Unified Text-to-Text Transformer", Journal of Machine Learning Research, 2020, vol. 21, 67 pages.
Ramachandran et al., "Stand-Alone Self-Attention in Vision Models", Conference on Neural Information Processing Systems, Dec. 8-14, 2019, Vancouver, Canada, 13 pages.
Ryoo et al., "AssembleNet: Searching for Multi-Stream Neural Connectivity in Video Architectures", International Conference on Learning Representations (ICLR), Apr. 26-May 1, 2020, Virtual, 15 pages.
Simonyan et al., "Two-Stream Convolutional Networks for Action Recognition in Videos", Conference on Neural Information Processing Systems, Dec. 8-13, 2014, Montreal, Canada, 9 pages.
Srinivas et al., "Bottleneck Transformers for Visual Recognition", Conference on Computer Vision and Pattern Recognition, Jun. 19-25, 2021, Virtual, pp. 16519-16529.
Sun et al., "Human Action Recognition using Factorized Spatio-Temporal Convolutional Networks", IEEE International Conference on Computer Vision, Dec. 11-18, 2015, Las Condes, Chile, pp. 4597-4605.
Sun et al., "Revisiting Unreasonable Effectiveness of Data in Deep Learning Era", IEEE International Conference on Computer Vision, Oct. 22-29, 2017, Venice, Italy, pp. 843-852.
Szegedy et al., "Going Deeper with Convolutions", IEEE Conference on Computer Vision and Pattern Recognition (CVPR), Jun. 8-12, 2015, Boston, MA, 9 pages.
Szegedy et al., "Rethinking the Inception Architecture for Computer Vision", IEEE Conference on Computer Vision and Pattern Recognition, Jun. 26-Jul. 1, 2016, Las Vegas, NV, pp. 2818-2826.
Tay et al., "Efficient Transformers: A Survey", arXiv:2009.06732v2, Sep. 16, 2020, 28 pages.
Tay et al., "Long Range Arena: A Benchmark for Efficient Transformers", arXiv:2011.04006v1, Nov. 8, 2020, 16 pages.
Touvron et al., "Training data-efficient image transformers & distillation through attention", arXiv:2012.12877v2, Jan. 15, 2021, 22 pages.
Tran et al., "A Closer Look at Spatiotemporal Convolutions for Action Recognition", IEEE/CVF Conference on Computer Vision and Pattern Recognition, Jun. 18-22, 2018, Salt Lake City, UT, pp. 6450-6459.
Tran et al., "Learning Spatiotemporal Features with 3D Convolutional Networks", IEEE International Conference on Computer Vision, Dec. 11-18, 2015, Las Condes, Chile, pp. 4489-4497.
Tran et al., "Video Classification with Channel-Separated Convolutional Networks", International Conference on Computer Vision, Oct. 27-Nov. 2, 2019, Seoul, Korea, pp. 5551-5560.
Vaswani et al., "Attention is All You Need", Conference on Neural Information Processing Systems Dec. 4-9, 2017, Long Beach, CA, 11 pages.
Wang et al., "AttentionNAS: Spatiotemporal Attention Cell Search for Video Classification", European Conference on Computer Vision, Aug. 23-28, 2020, Glasgow, UK, 16 pages.
Wang et al., "Dense Trajectories and Motion Boundary Descriptors for Action Recognition", International Journal of Computer Vision, 2013, vol. 103, pp. 60-79.
Wang et al., "End-to-End Instance Segmentation with Transformers", arXiv:2011.14503v5, Oct. 8, 2021, 10 pages.
Wang et al., "Linformer: Self-Attention with Linear Complexity", arXiv:2006.04768v3., Jun. 14, 2020, 12 pages.
Wang et al., "MaX-DeepLab: End-to-End Panoptic Segmentation with Mask Transformers", Conference on Computer Vision and Pattern Recognition, Jun. 19-25, 2021, Virtual, pp. 5463-5474.
Wang et al., "Non-local Neural Networks", IEEE/CVF Conference on Computer Vision and Pattern Recognition, Jun. 18-22, 2018, Salt Lake City, UT, pp. 7794-7803.
Wang et al., "Pyramid Vision Transformer: A Versatile Backbone for Dense Prediction without Convolutions", arXiv:2102.12122v2, Aug. 11, 2021, 15 pages.
Wang et al., "Temporal Segment Networks: Towards Good Practices for Deep Action Recognition", European Conference on Computer Vision, Oct. 8-16, 2016, Amsterdam, The Netherlands, pp. 20-36.
Wang et al., "Video Modeling with Correlation Networks", IEEE/CVF Conference on Computer Vision and Pattern Recognition (CVPR), Jun. 14-19, 2020, Virtual, pp. 349-358.
Weissenborn et al., "Scaling Autoregressive Video Models", International Conference on Learning Representations (ICLR), Apr. 26-May 1, 2020, Virtual, 24 pages.
Wu et al., "A Multigrid Method for Efficiently Training Video Models", IEEE/CVF Conference on Computer Vision and Pattern Recognition (CVPR), Jun. 14-19, 2020, Virtual, pp. 150-159.
Wu et al., "Long-Term Banks for Detailed Video Understanding", Conference on Computer Vision and Pattern Recognition, Jun. 16-20, 2019, Long Beach, CA, pp. 284-293.
Xie et al., "Rethinking Spatiotemporal Feature Learning: Speed-Accuracy Trade-offs in Video Classificaion", European Conference on Computer Vision, Sep. 8-14, 2018, Munich, Germany, 17 pages.
Zhang et al., "Dynamic Graph Message Passing Networks", IEEE/CVF Conference on Computer Vision and Pattern Recognition (CVPR), Jun. 14-19, 2020, Virtual, pp. 3723-3732.
Zhang et al., "mixup: Beyond Empirical Risk Minimization", International Conference on Learning Representations, Apr. 30-May 3, 2018, Vancouver, Canada, 13 pages.
Zhao et al., "Point Transformer", arXiv:2012.09164v1, Dec. 16, 2020, 10 pages.
Zheng et al., "Rethinking Semantic Segmentation from a Sequence-to-Sequence Perspective with Transformers", arXiv:2012.15840v1, Dec. 31, 2020, 12 pages.
Zhou et al., "Temporal Relational Reasoning in Videos", European Conference on Computer Vision, Sep. 8-14, 2018, Munich, Germany, pp. 831-846.
Zhuoran et al., "Global Self-Attention Networks for Image Recognition", arXiv:2010.03019v2, Oct. 14, 2020, 12 pages.

* cited by examiner

SYSTEMS AND METHODS FOR IMPROVED VIDEO UNDERSTANDING

FIELD

The present disclosure relates generally to machine-learning. More particularly, the present disclosure relates to systems and methods for improved video understanding.

BACKGROUND

Video classification refers to a machine-learning task of determining classifications for video data, such as a video segment or video clip. Existing approaches for video classification can be based on deep convolutional neural networks, or CNNs. The Transformer model refers to a class of machine-learned models that employs self-attention. Transformer models have been used in sequence-to-sequence modeling.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for classifying video data with improved accuracy. The method includes obtaining, by a computing system comprising one or more computing devices, video data comprising a plurality of video frames; extracting, by the computing system, a plurality of video tokens from the video data, the plurality of video tokens comprising a representation of spatiotemporal information in the video data; providing, by the computing system, the plurality of video tokens as input to a video understanding model, the video understanding model comprising a video transformer encoder model; and receiving, by the computing system, a classification output from the video understanding model.

Another example aspect of the present disclosure is directed to a computing system configured for classifying video data with improved accuracy. The computing system includes one or more processors and one or more memory devices storing a video understanding model comprising a video transformer encoder model and one or more operations that, when implemented by the one or more processors, cause the one or more processors to perform operations. The operations include obtaining video data comprising a plurality of video frames; extracting a plurality of video tokens from the video data, the plurality of video tokens comprising a representation of spatiotemporal information in the video data; providing the plurality of video tokens as input to a video understanding model, the video understanding model comprising a video transformer encoder model; and receiving a classification output from the video understanding model.

Another example aspect of the present disclosure is directed to a computer-implemented method for training a video understanding model for classifying video data with improved accuracy. The method includes obtaining, by a computing system comprising a plurality of computing devices, pretrained model data descriptive at least in part of a video understanding model, the video understanding model comprising at least one parameter of a video transformer encoder model; training, by the computing system, the pretrained model data based at least in part on a first dataset, the first dataset comprising image data, to determine first updated model data; and training, by the computing system, the first updated model data based at least in part on a second dataset, the second dataset comprising video data, to determine trained model data descriptive of a trained version of the video understanding model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
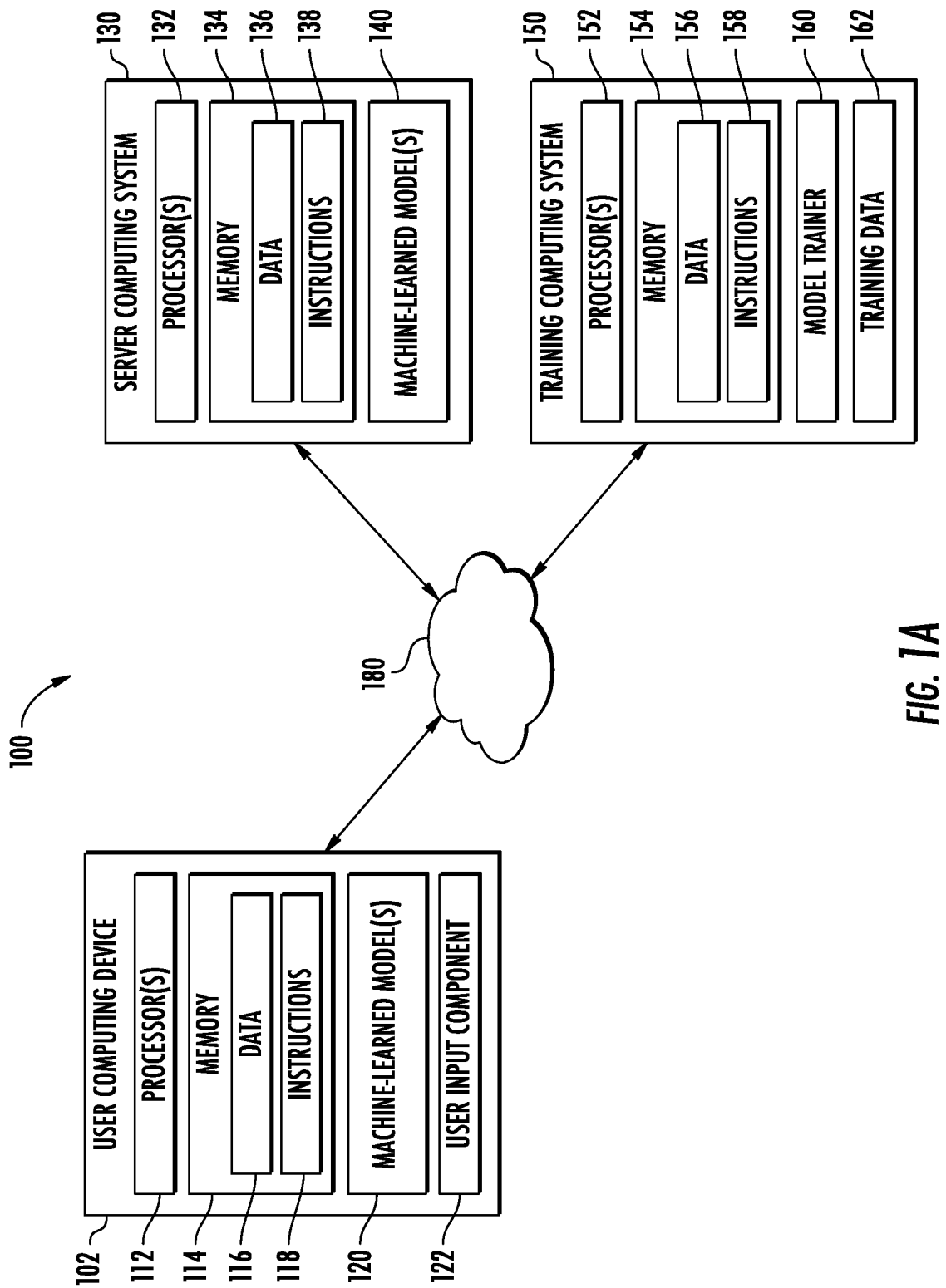
FIG. 1A depicts a block diagram of an example computing system that performs video understanding according to example embodiments of the present disclosure.

Reference numerals that are repeated across plural figures are intended to identify the same features in various implementations.

DETAILED DESCRIPTION

Generally, the present disclosure is directed to transformer-based machine-learned model architectures for improved video understanding. The models can operate on extracted spatiotemporal tokens from input video, which are then encoded by a series of transformer layers. Model architectures and variations described herein are capable of handling long sequences of tokens encountered in processing video data. For instance, transformer-based models as described herein can be regularized during training. Additionally, according to example aspects of the present disclosure, pretrained image models can be leveraged to provide for training on comparatively smaller video datasets.

In particular, example aspects of the present disclosure provide for transformer-based models for video classification. The transformer-based models can include a self-attention mechanism that computes self-attention on a sequence of spatiotemporal tokens that are extracted from the input video. The models can be factorized along spatiotemporal dimensions to increase efficiency and/or scalability. This can provide for improved usability of the models described herein with video data producing a large number of tokens. Additionally, the models can be regularized during training and/or can utilize pretrained image models to be trained effectively on smaller datasets.

Video understanding models according to example aspects of the present disclosure can adapt a transformer model architecture to process video data. Systems and methods according to example aspects of the present disclosure can be useful for video classifications. For instance, example aspects of the present disclosure can provide for achieving high accuracy on a diverse range of datasets, including different types of video footage, different dataset sizes, etc. with a single family of models. In some implementations, models that have been pre-trained on large image datasets for image classification can be leveraged to bootstrap training of video classification models according to example aspects of the present disclosure.

In some implementations, input to the video understanding model can be or can include video data, such as representations of video data (e.g., tokens). For instance, a computing system can obtain video data. The video data can include a plurality of image frames. The image frames can depict one or more objects. For example, the video data can be a video captured by a mobile device, video camera, or any other suitable video capturing device. The video data can be stored in any suitable manner. For instance, the video data can be stored in computer-readable memory in any suitable format, such as a digital file format (e.g., a .mp4 file format, a .wav file format, etc.). Consider a video $V \in \mathbb{R}^{T \times H \times W \times C}$. For instance, in some implementations, the video data can include a number of image frames (e.g., T), a height (e.g., H), a width (e.g., W), and/or a number of channels (e.g., C). As an example, in some implementations, the video data can include 3 channels, such as a red channel, a green channel, a blue channel, and/or other color channels.

According to example aspects of the present disclosure, a computing system can extract a plurality of video tokens from the video data. The video tokens can be a representation (e.g., an embedding representation) of spatiotemporal information of the video data. In some implementations, the plurality of video tokens are single-dimensional. The video tokens (e.g., the tubelets) may span a single frame t and/or a plurality of frames t. The video tokens (e.g., the tubelets) may be extracted from non-overlapping video data. For instance, a given portion of video data (e.g., a given pixel) may be represented exactly once in the plurality of video tokens (e.g., the tubelets). Additionally and/or alternatively, the video tokens (e.g., the tubelets) may span an entirety of the video data, such as the entire spatiotemporal volume defined by the video data. Processing a video can involve a large number of extracted tokens. Video understanding models according to example aspects of the present disclosure can be designed to process these video tokens, including a large number of video tokens.

For instance, in some implementations, the video tokens can be formed from "tubelets" having a length (e.g., l) and width (e.g., w) and spanning a number of video frames (e.g., t) that are then projected into a tensor representation (e.g., a d-dimensional vector). For instance, in some implementations, extracting the plurality of video tokens can include extracting (e.g., by the computing system) a plurality of video tubelets from the video data. According to example aspects of the present disclosure, N (e.g., non-overlapping) tubelets, $x_i \in \mathbb{R}^{t \times h \times w}$ can be extracted from the video data. Intuitively, this approach fuses spatiotemporal information during tokenization, which can be beneficial for improving video understanding.

For instance, the computing system can extract a plurality of tokens $\tilde{z} \in \mathbb{R}^{n_t \times n_h \times n_w \times d}$ from tubelets of the video $V \in \mathbb{R}^{T \times H \times W \times C}$, where $n_s$ among dimension s is the number of tokens along the dimension (e.g., $$\left(\text{e.g., floor}\left(\frac{T}{t}\right), \text{floor}\left(\frac{H}{h}\right), \text{floor}\left(\frac{W}{w}\right)\right).$$

In some implementations, the plurality of video tubelets are nonoverlapping. In some implementations, each of the plurality of video tubelets spans one of the plurality of video frames. In some implementations, each of the plurality of video tubelets spans two or more of the plurality of video frames. Furthermore, in some implementations, a length and/or width of the tubelets may be equivalent to and/or less than a length and/or width of the video data. For instance, in some implementations, a tubelet may be or may include a single (e.g., entire) frame. Smaller tubelets can result in more tokens, which can thus increase computational cost of processing the tokens. However, systems and methods described herein can nonetheless be capable of processing the tokens.

Additionally and/or alternatively, extracting the plurality of video tokens can include projecting, by the computing system, the plurality of video tubelets to a plurality of tensor representations of the plurality of video tubelets. As an example, the plurality of tubelets can be projected by linear projection (e.g., into an array or matrix). For instance, an array of tubelets having size $$\text{floor}\left(\frac{T}{t}\right) \times \text{floor}\left(\frac{H}{h}\right) \times \text{floor}\left(\frac{W}{w}\right)$$

can be extracted from the video data.

Additionally and/or alternatively, extracting the plurality of video tokens can include merging (e.g., by the computing system) the plurality of tensor representations along at least one dimension to produce the plurality of video tokens. For instance, the array of tubelets can be compressed into a sequence of d-dimensional token representations by merging spatiotemporal dimensions. As one example, the tokens can be ordered in a single dimension based on frame index and/or position within the frame. This sequence of spatiotemporal tokens can then be passed through the video understanding model.

In some implementations, positional embeddings can be added to the sequence of tokens. As an example, in some implementations, positional embeddings are added to the plurality of video tokens and (e.g., subsequently) input to the video understanding model. For instance, this can assist permutation invariant models (e.g., transformers) with spatiotemporal understanding. As an example, once the positional embeddings are added, in some implementations, the tokens can be reshaped to obtain the input to the video understanding model.

According to example aspects of the present disclosure, a computing system can provide the plurality of video tokens to the video understanding model. The video understanding model can include a video transformer encoder model. The transformer encoder model can include an attention mechanism (e.g., a self-attention mechanism), at least one normalization layer and/or at least one multi-layer perceptron layer.

In some implementations, the video understanding model can process the entire sequence of tokens directly. For instance, in some implementations, the video understanding model includes a (e.g., nonfactorized) attention mechanism (e.g., self-attention mechanism), a normalization layer, and a multi-layer perceptron layer. The sequence of tokens (e.g., and/or position embedding(s), classification (CLS) token(s), etc.) can be input directly to this model. The video understanding model can thus model pairwise interactions between all pairs of spatiotemporal tokens in the input sequence. This approach can be computationally expensive, but achieves improved results on large datasets with ample training data. The parameters of this model can be initialized from an image-pretrained model for faster training and higher accuracy.

In some implementations, the video understanding model can include a factorized encoder. The factorized encoder can include two separate subencoders (e.g., transformers) in series. The factorized encoder can include, for instance, a spatial transformer encoder and a temporal transformer encoder. The spatial transformer encoder can be configured to receive the plurality of video tokens and produce, in response to receipt of the plurality of video tokens, a plurality of temporal representations. The temporal transformer encoder can be configured to receive the plurality of temporal representations and produce, in response to receipt of the plurality of temporal representations, a spatiotemporal representation of the video data, wherein the spatiotemporal representation is classified to produce the classification output. For instance, the first subencoder, referred to as the spatial encoder, models interactions between tokens extracted from the same temporal index. A token representation for each temporal index (e.g., frame) is obtained from the first subencoder. For instance, a representation for each temporal index, $h_i \in \mathbb{R}^d$, can be obtained from the spatial encoder (e.g., after $L_s$ layers). If prepended to the input, this can be equivalent to a classification token. Otherwise, this can be a global average pooling from the tokens output by the spatial encoder. The representations across different temporal indices can be aggregated into a single vector. The temporal representations $h_t$ can be concatenated into a vector $H \in \mathbb{R}^{n_t \times d}$.

Thereafter, a second subencoder, referred to as the temporal encoder, models interactions between these tokens. For instance, the vector can be forwarded through the temporal encoder (e.g., including $L_t$ layers) to model interactions between tokens from different temporal indices. The output from the temporal encoder can then be classified (e.g., by a classification model, such as a multi-layer perceptron model) In some implementations, the parameters of the spatial encoder can be initialized from an image-pretrained model for faster training. This model can be significantly faster than other models (e.g., processing all tokens directly) especially as the sequence length of tokens increases, as it does not compute pairwise interactions between all input tokens. For instance, compared to the model that operates on all tokens directly, the factorized encoder can include a greater number of transformer layers, but require fewer floating point operations (FLOPs) to compute.

Additionally and/or alternatively, in some implementations, the video understanding model can include factorized self-attention. The factorized self-attention mechanism can include a first self-attention block configured to compute spatial self-attention among the plurality of video tokens from a same temporal index and a second self-attention block configured to compute temporal self-attention among the plurality of video tokens from a same spatial index. These computations may be performed sequentially in either order and/or in parallel. Factorized self-attention decomposes the multi-headed self-attention operation within a Transformer layer such that, at first, self-attention is only computed spatially. Thereafter, self-attention is only computed temporally. This can model spatiotemporal interactions more efficiently by factorizing the operation over two smaller sets of elements with comparable computational complexity.

In some implementations, the plurality of video tokens are reshaped prior to being input to the factorized self-attention mechanism. For instance, the tokens can be reshaped from $\mathbb{R}^{1 \times n_t \cdot n_h \cdot n_w \cdot d}$ to $\mathbb{R}^{n_t \times n_h \cdot n_w \cdot d}$. Reshaping the tokens can provide for more efficient computation.

The parameters of the spatial transformer can be initialized from an image-pretrained model. Additionally and/or alternatively, the parameters of the temporal transformer can be initialized as a vector of zeros. This can accelerate training and/or improve overall model performance. The factorized self-attention mechanism can include the same number of transformer layers as the model that operates on all tokens. However, the number of parameters does increase due to the additional self-attention layer. In some implementations, a classification token is not used as part of the input in this model to avoid ambiguities when reshaping the input tokens between spatial and temporal dimensions.

Additionally and/or alternatively, in some implementations, the video understanding model can include factorized dot-product attention. The factorized dot-product attention mechanism can include a plurality of spatial attention heads configured to compute attention weights for each of the plurality of video tokens over a spatial dimension and a plurality of temporal attention heads configured to compute attention weights for each of the plurality of video tokens over a temporal dimension. Factorized dot-product attention factories the multi-head dot-product attention operation within the transformer. As a result, the attention neighborhood for each token is modified to only attend over spatial dimensions and temporal dimensions separately. For instance, the keys and values for each query can be modified to attend over tokens from the same spatial and/or temporal index. A first half of attention heads can attend over tokens from the spatial dimensions and a second half of attention heads can attend over the temporal dimension. In some implementations, outputs from the plurality of spatial attention heads and the plurality of temporal attention heads are combined by concatenation and linear projection.

In some implementations, this model may not add any parameters compared to an image-pretrained model, and thus can be initialized directly from it. The factorized dot-product attention can provide a comparable number of parameters to the model that operates directly on all tokens while having comparable computational complexity to the factorized self-attention and factorized encoder. Note that these embodiments are not mutually exclusive, and a given video understanding model may include none or any other combination of a factorized encoder, factorized self-attention and/or factorized dot-product attention.

According to example aspects of the present disclosure, a computing system can receive a video understanding output from the video understanding model. For instance, in some implementations, the video understanding output can be a video classification output. The video classification output can include data indicative of the video data belonging to at least one class of a plurality of candidate classes. For instance, in some implementations, the video understanding model can output, as the video classification output, a plurality of logit scores respectively associated with the plurality of candidate classes. The logit scores can be indicative of a likelihood, probability, confidence, etc. that the video data belongs to the respective candidate class. For instance, the classification output can include, for each candidate class of the plurality of candidate classes, a logit score respectively associated with the candidate class, where the logit score is indicative of a probability or confidence that the video segment described by the video data is properly classified by the candidate class. In some implementations, the logit scores can be one-hot such that, for a given classification output, a single logit score may be nonzero, with all other logit scores having zero values. In some implementations, the logit scores may be discrete values (e.g., 0 or 1). In some implementations, the logit scores may range from a minimum value (e.g., 0) to a maximum value (e.g., 1).

Additionally and/or alternatively the classification output may be or include a word or phrase descriptive of at least a portion of a video segment described by the video data. For instance, in some implementations, the classification output can be a phrase of one or more words that is descriptive of a subject of the video segment, such as object(s) depicted in the video segment, action(s) performed or described in the video segment, topic(s) included in the video segment, and/or other suitable subjects. As an example, in some implementations, the word or phrase can be output directly from the video classification model. As another example, in some implementations, each candidate class of the plurality of candidate classes (e.g., each logit score) can have a respectively associated word or phrase.

In some implementations, the classification output can be averaged across multiple sets of video data to achieve a final classification output. For instance, in some implementations, longer video segments can be split into multiple views, and each view can be separately input into the video understanding model. The output (e.g., logits) per view can be averaged together to produce a final output for the longer video segments.

One challenge present in the use of video data with machine-learned (e.g., transformer-based) model architectures is that many architectures can require large corpuses of training data to effectively train the model(s). For instance, many architectures operating on image data can be trained using large datasets such as ImageNet 21K, JFT, etc. such that the model(s) can be trained to an acceptable degree. However, generation of video datasets at this scale can be costly, and, as such, comparably-sized datasets generally do not exist for video data. For some machine-learned model architectures, especially those having inductive biases (e.g., convolutional models), this challenge may not be detrimental to use of the model. For some models lacking inductive biases (e.g., transformer models), this can complicate use of the model unless a sufficiently sized dataset is available. For instance, transformer models may only provide effective predictions when trained on large-scale datasets. Currently, even the largest video datasets such as Kinetics have several orders of magnitude fewer labeled examples than corresponding image datasets. As a result, training large models from scratch to high accuracy can be prohibitively challenging. To solve this problem, example aspects of the present disclosure provide for initializing the models described herein from pretrained image models. Example aspects of the present disclosure are directed to effective strategies for leveraging pretrained image models to initialize large-scale video understanding models, such as on how to initialize parameters that may be incompatible with image models.

For instance, in some implementations, a position embedding is added to each input token. However, video models can have many more tokens (e.g., $n_t$ times more tokens) than image models (e.g., from having t frames). As a result, to initialize the positional embedding, it can be beneficial to repeat the token temporally over each frame. Therefore, at initialization, all tokens with the same spatial index can have the same embedding, which can then be fine-tuned.

As another example, in some implementations, the tubelet embedding filter may be a three-dimensional tensor compared to a two-dimensional tensor in an image model (e.g., due to the temporal dimension). One approach to initialize the three-dimensional filter from the two-dimensional filter is to inflate it by replicating the filter along the temporal dimension and averaging them. Another approach, termed "central frame initialization", includes initializing the filter with zeroes along all temporal positions except at the temporal center. In this case, the filter can effectively behave like frame sampling at initialization while still having the capability to learn to aggregate temporal information from multiple frames as training progresses.

As another example, in some implementations, the factorized self-attention transformer block can include two multi-headed self-attention (MSA) modules, where a standard image model may include only one MSA module. Thus, in some implementations, the spatial self-attention model can be initialized from the pretrained module and the temporal self-attention model can be initialized with zeroes. In this case, the model behaves as a residual connection at initialization.

Systems and methods according to example aspects of the present disclosure can provide for a number of technical effects and benefits, including improvements to computing technology. For instance, video understanding models including transformers (e.g., attention mechanisms) can outperform some existing models in video understanding tasks such as video classification. For example, models according to example aspects of the present disclosure can achieve improved accuracy of classification outputs on video classification tasks. This can provide for improved user experience, improved data management, etc. As one example, models according to example aspects of the present disclosure can achieve state-of-the-art results on many video classification benchmarks, such as Kinetics (e.g., Kinetics 400 and/or 600), Epic Kitchens 100, Something-Something v2, Moments in Time, etc.

With reference now to the Figures, example embodiments of the present disclosure will be discussed in further detail.

FIG. 1A depicts a block diagram of an example computing system 100 that performs video understanding (e.g., video classification) with improved accuracy according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more video understanding models 120. For example, the video understanding models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example video understanding models 120 are discussed with reference to FIGS. 2 through 6.

In some implementations, the one or more video understanding models 120 can be received from the server computing system 130 over network 180, stored in the user computing device memory 114, and then used or otherwise implemented by the one or more processors 112. In some implementations, the user computing device 102 can implement multiple parallel instances of a single video understanding model 120 (e.g., to perform parallel video understanding across multiple instances of a video understanding model).

Additionally or alternatively, one or more video understanding models 140 can be included in or otherwise stored and implemented by the server computing system 130 that communicates with the user computing device 102 according to a client-server relationship. For example, the video understanding models 140 can be implemented by the server computing system 140 as a portion of a web service (e.g., a video classification service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more video understanding models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2 through 6.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the video understanding models 120 and/or 140 based on a set of training data 162. The training data 162 can include, for example, image datasets and/or video datasets. For instance, in some implementations, the training data 162 can include a first dataset. The first dataset can be an image dataset. The models 120 and/or 140 can be trained using the first dataset. Generally, image datasets are more widely available than video datasets, and can be useful in partially training a video understanding model. Additionally, the training data 162 can include a second dataset. The second dataset can be a video dataset. The second dataset may have comparatively smaller amounts of training data (albeit more closely related to the video classification task) than the first dataset, such as due to a lack of available training data (e.g., for the video classification task). Subsequent to being trained using the first dataset, the models 120 and/or 140 can be trained using the second dataset.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be video data. The machine-learned model(s) can process the video data to generate an output. As an example, the machine-learned model(s) can process the video data to generate a video recognition output (e.g., a recognition of the video data, a latent embedding of the video data, an encoded representation of the video data, a hash of the video data, etc.). As another example, the machine-learned model(s) can process the video data to generate a video segmentation output. As another example, the machine-learned model(s) can process the video data to generate a video classification output. As another example, the machine-learned model(s) can process the video data to generate a video data modification output (e.g., an alteration of the video data, etc.). As another example, the machine-learned model(s) can process the video data to generate an encoded video data output (e.g., an encoded and/or compressed representation of the video data, etc.). As another example, the machine-learned model(s) can process the video data to generate an upscaled video data output. As another example, the machine-learned model(s) can process the video data to generate a prediction output.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
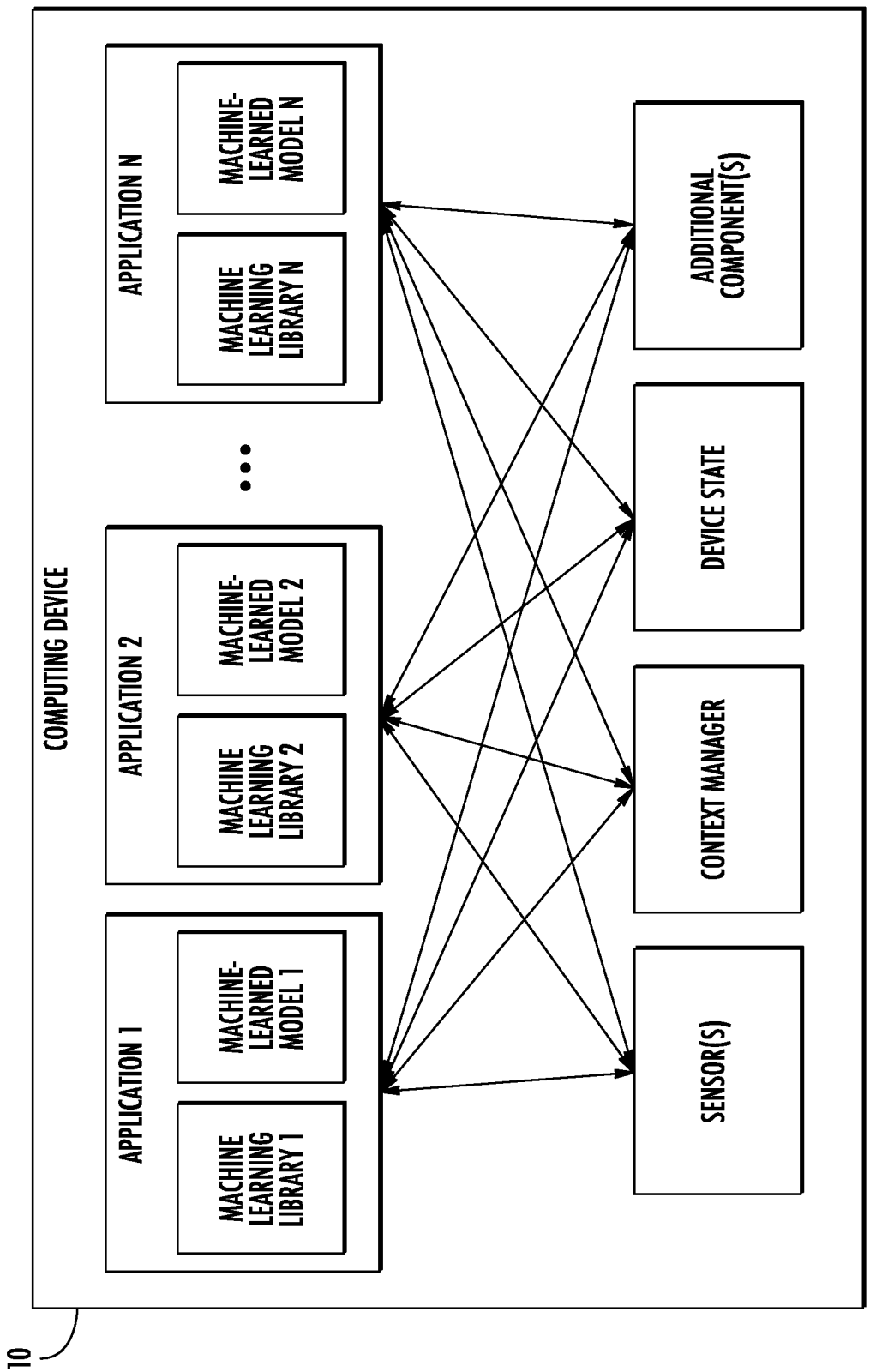
FIG. 1B depicts a block diagram of an example computing device that performs video understanding according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
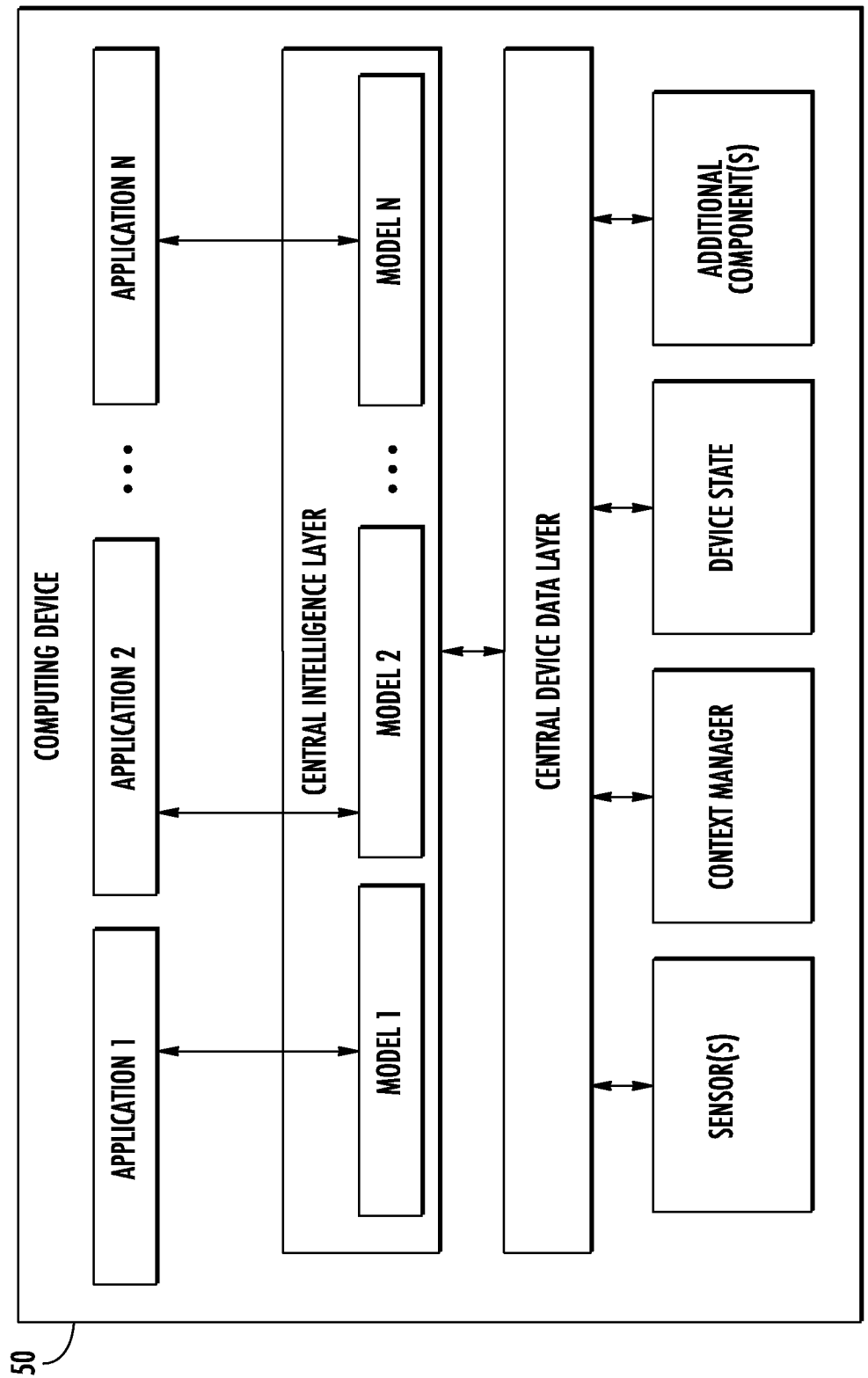
FIG. 1C depicts a block diagram of an example computing device that performs video understanding according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
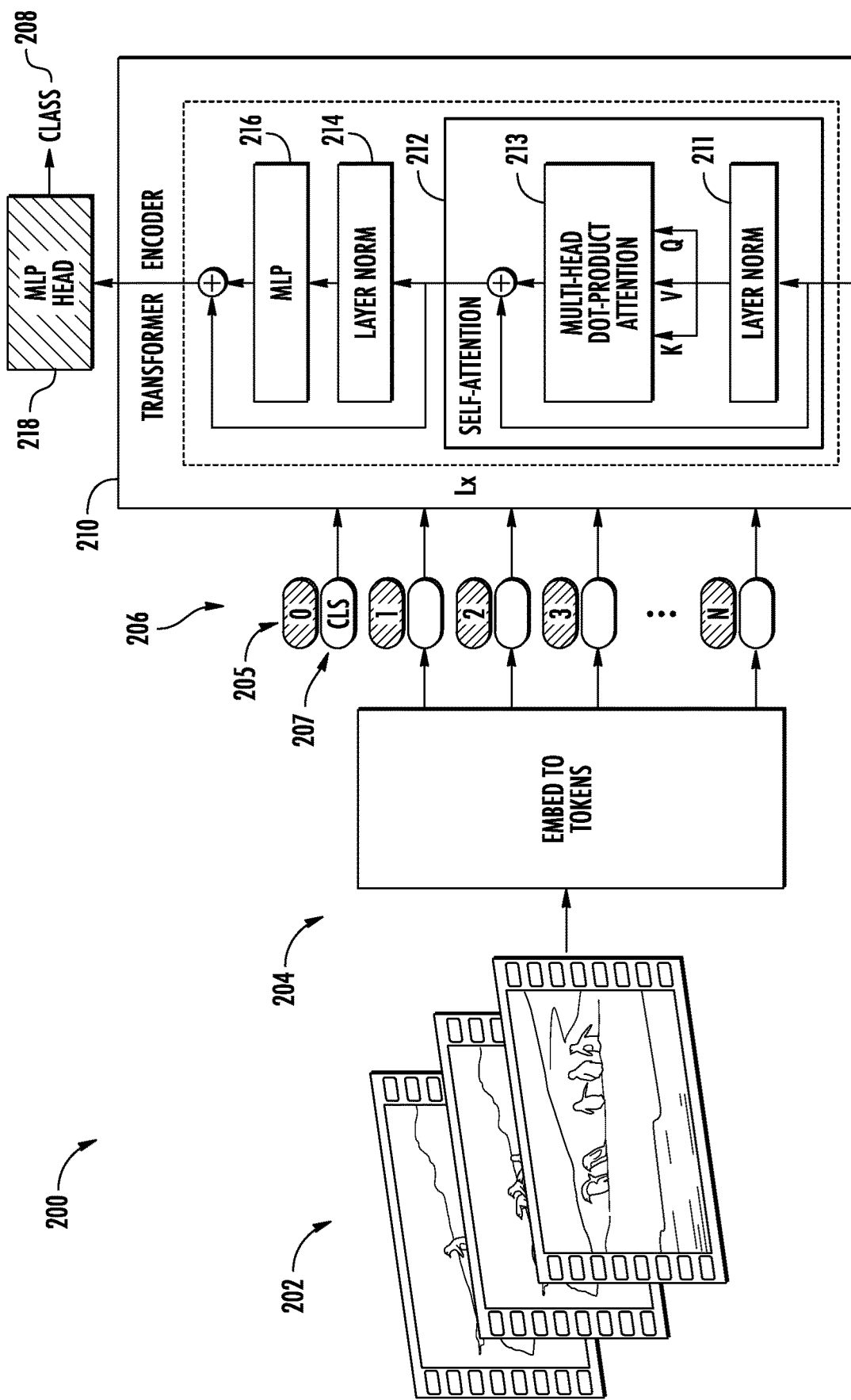
FIG. 2 depicts a block diagram of an example video understanding model according to example embodiments of the present disclosure.

FIG. 2 depicts a block diagram of an example video understanding model 200 according to example embodiments of the present disclosure. The video understanding model 200 can be configured to receive input data 202 (e.g., video data) and produce, in response to receipt of the input data 202, output data 208 (e.g., a classification output). At 204, the model 200 can extract a plurality of video tokens 206 from the video data 202. Example tokenization approaches are discussed with reference to FIGS. 3A through 3B. The video tokens 206 can be a representation (e.g., an embedding representation) of spatiotemporal information of the video data 202. In some implementations, the plurality of video tokens 206 are single-dimensional. Processing a video can involve a large number of extracted tokens. Video understanding model 200 can be designed to process these video tokens, including a large number of video tokens. In some implementations, the tokens 206 can include position embeddings 205. Additionally and/or alternatively, in some implementations, the tokens 206 can include a classification token 207 (e.g., at position 0).

The video understanding model 200 can include a video transformer encoder model 210. The transformer encoder model 210 can include an attention mechanism 212 (e.g., a self-attention mechanism), at least one normalization layer 214 and/or at least one multi-layer perceptron layer 216. The self-attention mechanism 212 can include, for example, a normalization layer 211 that feeds a multi-head dot-product attention mechanism 213. In some implementations, such as in the implementation depicted in FIG. 2, the video understanding model can process the entire sequence of tokens 206 directly. For instance, the sequence of tokens 206 (e.g., and/or position embedding(s) 205, classification (CLS) token(s) 207, etc.) can be input directly to the transformer encoder model 210. The video understanding model 200 can thus model pairwise interactions between all pairs of spatiotemporal tokens in the input sequence. This approach can be computationally expensive, but achieves improved results on large datasets with ample training data. The parameters of this model can be initialized from an image-pretrained model for faster training and higher accuracy.

Output from the transformer encoder 210 can be provided to a classification model (e.g., a multi-layer perceptron head) 218 which can classify the output and provide the video classification output 208.

Figure 3A:
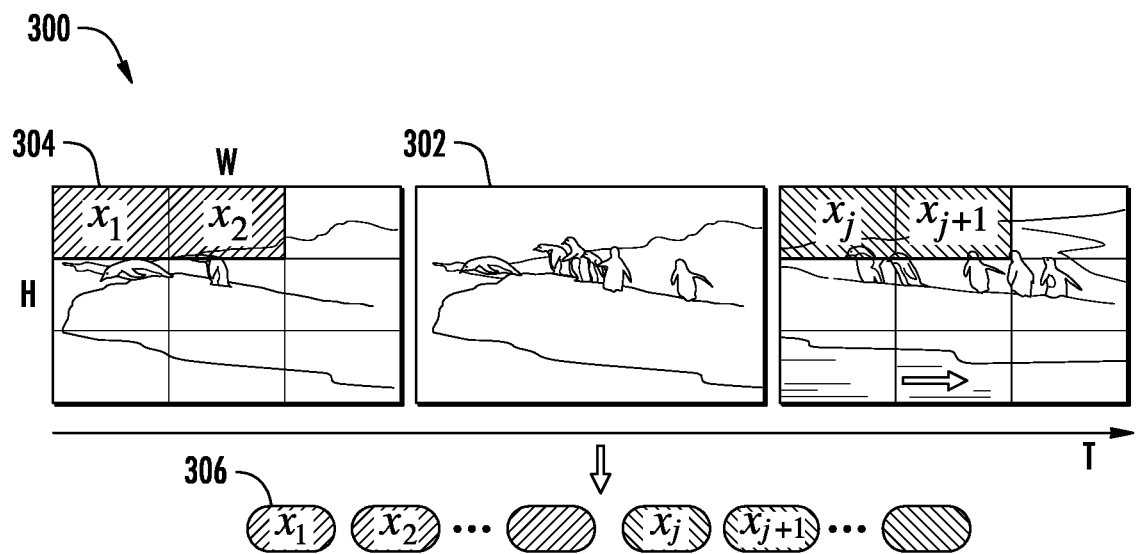
FIG. 3A depicts a data flow diagram of an example uniform frame sampling approach for tokenizing video data according to example embodiments of the present disclosure.

FIG. 3A depicts a data flow diagram of an example uniform frame sampling approach for tokenizing video data according to example embodiments of the present disclosure. For instance, the video data 300 can include a plurality of video frames 302. According to example aspects of the present disclosure, each frame can be broken into one or more "patches" 304. For instance, each patch 304 can span a subset of the length and/or width of a single frame 302. The patches 304 can be single-frame tubelets, for example. Each patch 304 can be projected and/or rasterized into a respective token 306. The tokens 306 can be ordered by frame 302 and/or by patch 304 in a sequence.

Figure 3B:
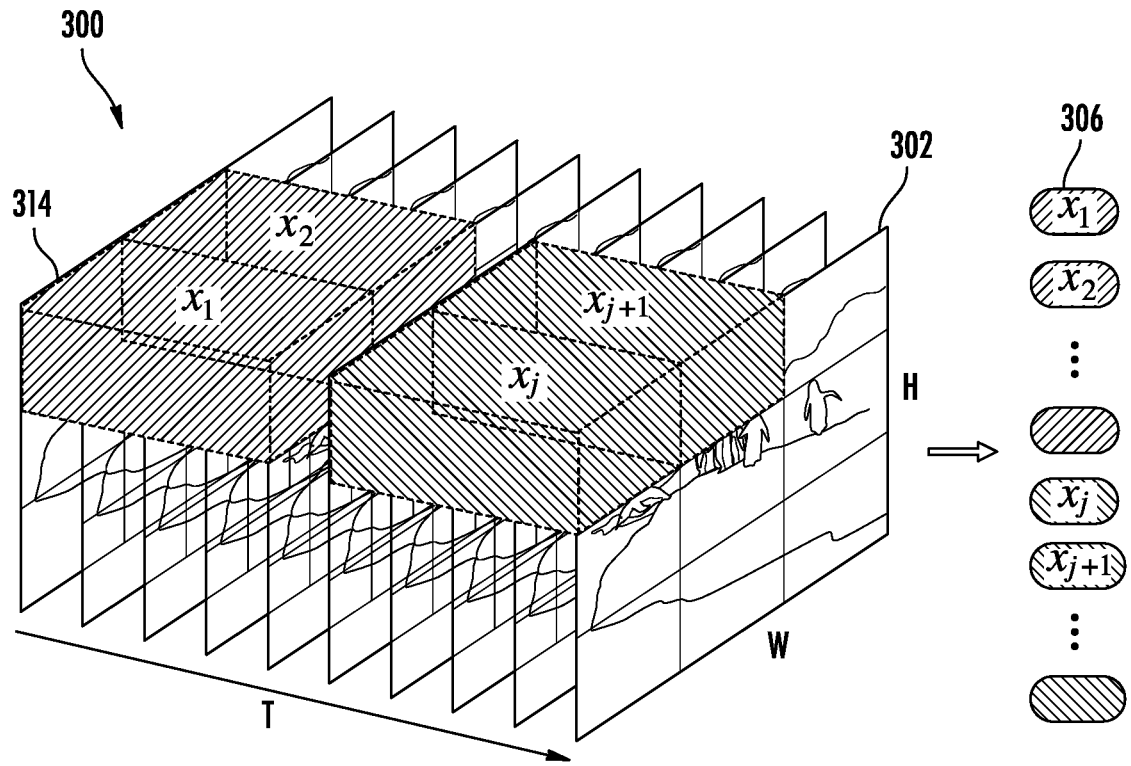
FIG. 3B depicts a data flow diagram of an example tubelet embedding approach for tokenizing video data according to example aspects of the present disclosure.

FIG. 3B depicts a data flow diagram of an example tubelet embedding approach for tokenizing video data according to example aspects of the present disclosure. As in FIG. 3A, the video data 300 can include a plurality of video frames 302. According to example aspects of the present disclosure, the video data can be decomposed into tubelets 314. Each tubelet can span one or more of the video frames 302. For instance, the tubelets 314 may cover a common spatial region over a plurality of frames. Each tubelet 314 can be projected into a corresponding token 306.

For instance, in some implementations, the video tokens 306 can be formed from tubelets 314 having a length (e.g., 1) and width (e.g., w) and spanning a number of video frames 302 (e.g., t) that are then projected into a tensor representation (e.g., a d-dimensional vector). For instance, in some implementations, extracting the plurality of video tokens 306 can include extracting (e.g., by the computing system) a plurality of video tubelets 314 from the video data 300. According to example aspects of the present disclosure, N (e.g., non-overlapping) tubelets 314, $x_i \in \mathbb{R}^{t \times h \times w}$ can be extracted from the video data 300. Intuitively, this approach fuses spatiotemporal information during tokenization, which can be beneficial for improving video understanding.

For instance, the computing system can extract a plurality of tokens 306 ($\tilde{z} \in \mathbb{R}^{n_t \times n_h \times n_w \times d}$) from tubelets 314 of the video 300 ($V \in \mathbb{R}^{T \times H \times W \times C}$), where $n_s$ among dimension s is the number of tokens 306 along the dimension (e.g., $$\left(\text{e.g., floor}\left(\frac{T}{t}\right), \text{floor}\left(\frac{H}{h}\right), \text{floor}\left(\frac{W}{w}\right)\right).$$

In some implementations, the plurality of video tubelets 314 are nonoverlapping. In some implementations, each of the plurality of video tubelets 314 spans one of the plurality of video frames 302. In some implementations, each of the plurality of video tubelets 314 spans two or more of the plurality of video frames 302. Furthermore, in some implementations, a length and/or width of the tubelets 314 may be equivalent to and/or less than a length and/or width of the video data 300. For instance, in some implementations, a tubelet 314 may be or may include a single (e.g., entire) frame 302. Smaller tubelets 314 can result in more tokens 306, which can thus increase computational cost of processing the tokens 306. However, systems and methods described herein can nonetheless be capable of processing the tokens 306.

Additionally and/or alternatively, extracting the plurality of video tokens 306 can include projecting, by the computing system, the plurality of video tubelets 314 to a plurality of tensor representations of the plurality of video tubelets 314. As an example, the plurality of tubelets 314 can be projected by linear projection (e.g., into an array or matrix). For instance, an array of tubelets 314 having size $$\text{floor}\left(\frac{T}{t}\right) \times \text{floor}\left(\frac{H}{h}\right) \times \text{floor}\left(\frac{W}{w}\right)$$

can be extracted from the video data 300.

Additionally and/or alternatively, extracting the plurality of video tokens 306 can include merging (e.g., by the computing system) the plurality of tensor representations along at least one dimension to produce the plurality of video tokens 306. For instance, the array of tubelets 314 can be compressed into a sequence of d-dimensional token 306 representations by merging spatiotemporal dimensions. As one example, the tokens 306 can be ordered in a single dimension based on frame 302 index and/or position within the frame 302. This sequence of spatiotemporal tokens 306 can then be passed through the video understanding model (e.g., video understanding model 200 of FIG. 2).

Figure 4A:
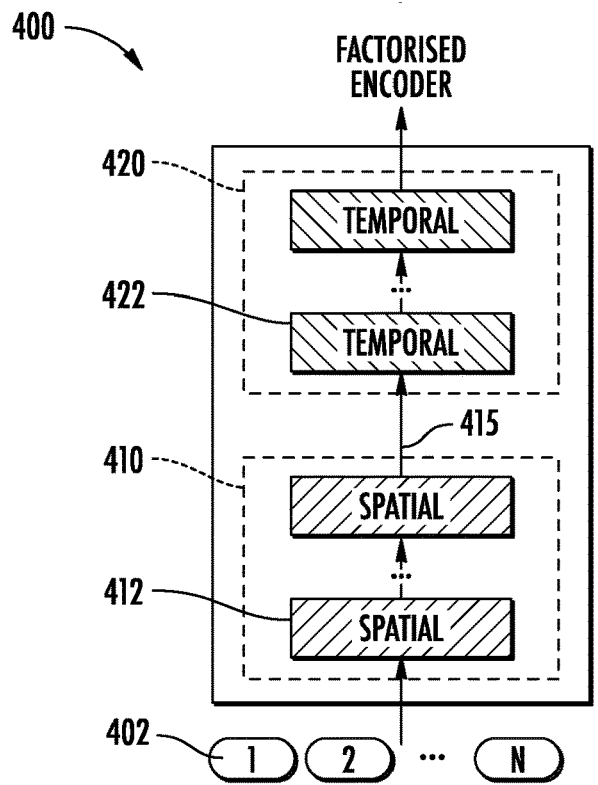
FIG. 4A depicts a block diagram of an example factorized encoder according to example embodiments of the present disclosure.
Figure 4B:
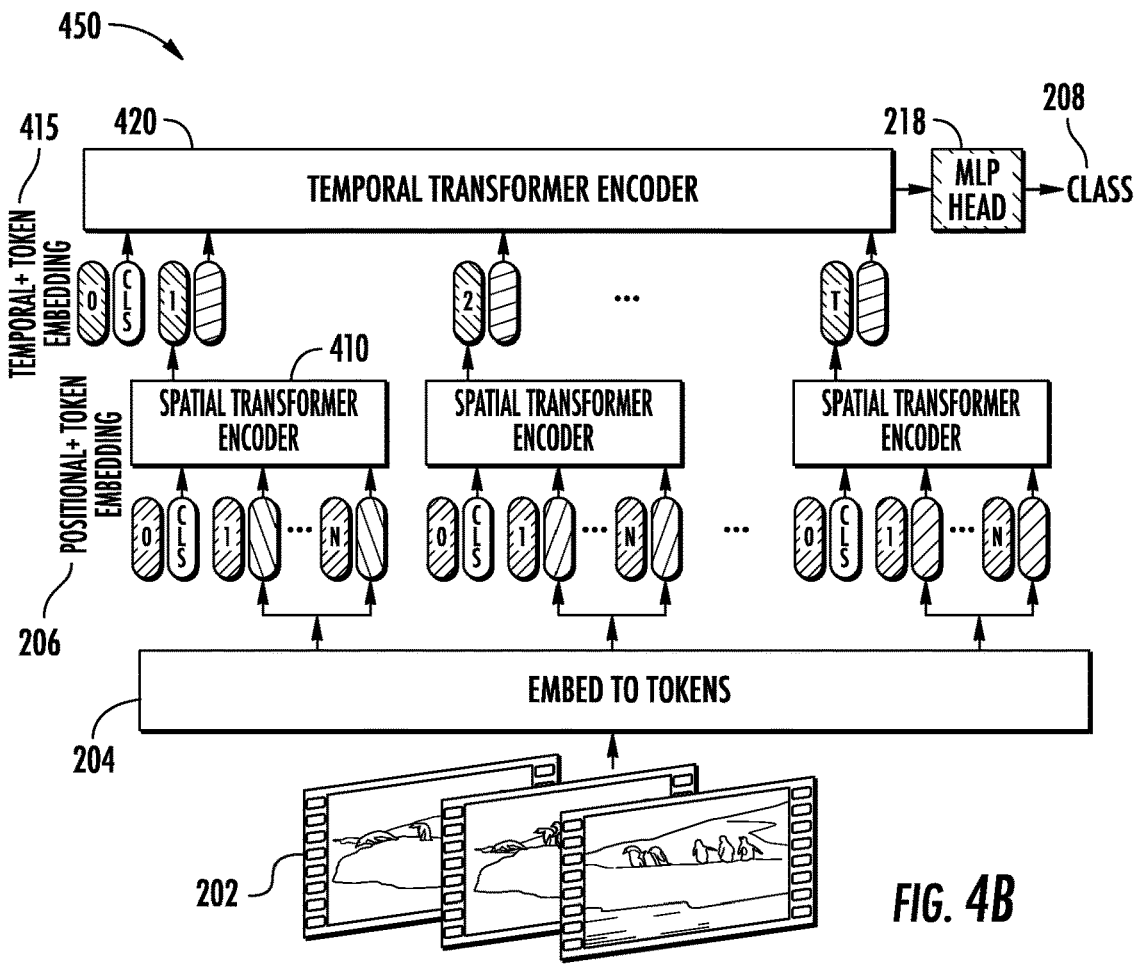
FIG. 4B depicts a block diagram of the factorized encoder discussed with reference to FIG. 4A incorporated into a video understanding model according to example embodiments of the present disclosure.

FIG. 4A depicts a block diagram of an example factorized encoder 400 according to example embodiments of the present disclosure. FIG. 4B depicts a block diagram of the factorized encoder discussed with reference to FIG. 4A incorporated into a video understanding model 450 including components discussed with reference to FIG. 2. The factorized encoder 400 can include two separate subencoders (e.g., transformers) in series including, for instance, a spatial transformer encoder 410 and a temporal transformer encoder 420. The spatial transformer encoder 410 can include one or more spatial transformer encoder layers 412. Additionally and/or alternatively, the temporal transformer encoder 420 can include one or more temporal transformer encoder layers 422. The spatial transformer encoder 410 can be configured to receive the plurality of video tokens 402 and produce, in response to receipt of the plurality of video tokens 402, a plurality of temporal representations 415. The temporal transformer encoder 420 can be configured to receive the plurality of temporal representations 415 and produce, in response to receipt of the plurality of temporal representations, a spatiotemporal representation of the video data, wherein the spatiotemporal representation is classified to produce the classification output. For instance the spatial encoder 410 models interactions between tokens 402 extracted from the same temporal index. A token representation 415 for each temporal index (e.g., frame) is obtained from the spatial encoder 410. For instance, a representation 415 for each temporal index, $h_i \in \mathbb{R}^d$, can be obtained from the spatial encoder 410 (e.g., after $L_s$ layers 412). If prepended to the input, this can be equivalent to a classification token. Otherwise, this can be a global average pooling from the tokens output by the spatial encoder. The representations across different temporal indices can be aggregated into a single vector (e.g., representation 415. The temporal representations $h_i$ can be concatenated into a vector $H \in \mathbb{R}^{n_t \times d}$.

Thereafter, the temporal encoder 420 models interactions between the representations 415. For instance, the temporal representations 415 can be forwarded through the temporal encoder 420 (e.g., including $L_t$ layers 422) to model interactions between tokens 402 from different temporal indices. The output from the temporal encoder 420 can then be classified (e.g., by a classification model, such as a multi-layer perceptron model). In some implementations, the parameters of the spatial encoder 410 can be initialized from an image-pretrained model for faster training. This model can be significantly faster than other models (e.g., processing all tokens directly) especially as the sequence length of tokens increases, as it does not compute pairwise interactions between all input tokens. For instance, compared to the model that operates on all tokens directly, the factorized encoder 400 can include a greater number of transformer layers, but require fewer floating point operations (FLOPs) to compute.

Figure 5A:
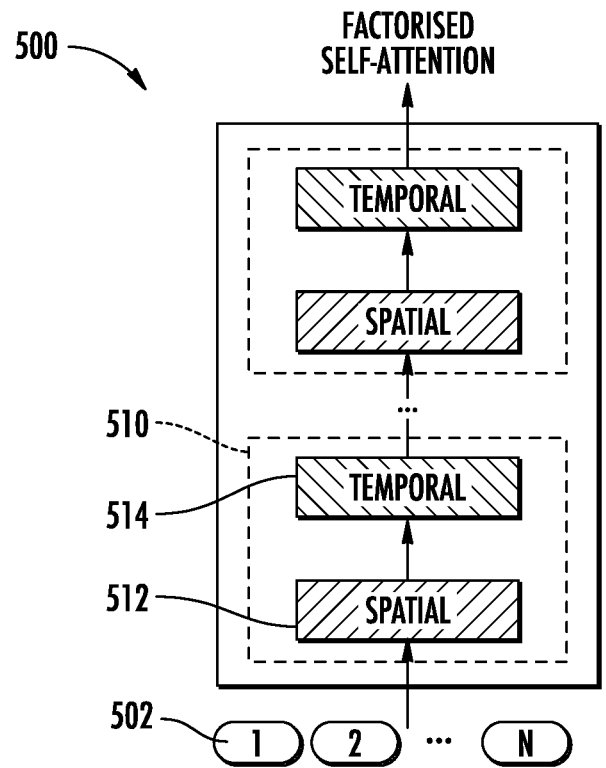
FIG. 5A depicts a block diagram of an example factorized self-attention mechanism according to example embodiments of the present disclosure.

FIG. 5A depicts a block diagram of an example factorized self-attention mechanism 500 according to example embodiments of the present disclosure. The factorized self-attention mechanism 500 can include one or more self-attention layers 510. Each layer 510 can include a spatial self-attention block 512 configured to compute spatial self-attention among the plurality of video tokens 502 from a same temporal index. Additionally, each layer 510 can include a temporal self-attention block 514 configured to compute temporal self-attention among the plurality of video tokens 502 from a same spatial index. These computations may be performed sequentially in either order and/or in parallel. Factorized self-attention decomposes the multi-headed self-attention operation within a Transformer layer such that, at first, self-attention is only computed spatially. Thereafter, self-attention is only computed temporally. This can model spatiotemporal interactions more efficiently by factorizing the operation over two smaller sets of elements with comparable computational complexity.

In some implementations, the plurality of video tokens 502 are reshaped prior to being input to the factorized self-attention mechanism. For instance, the tokens 502 can be reshaped from $\mathbb{R}^{1 \times n_t \cdot n_h \cdot n_w \cdot d}$ to $\mathbb{R}^{n_t \times n_h \times n_w \times d}$. Reshaping the tokens 502 can provide for more efficient computation.

Figure 5B:
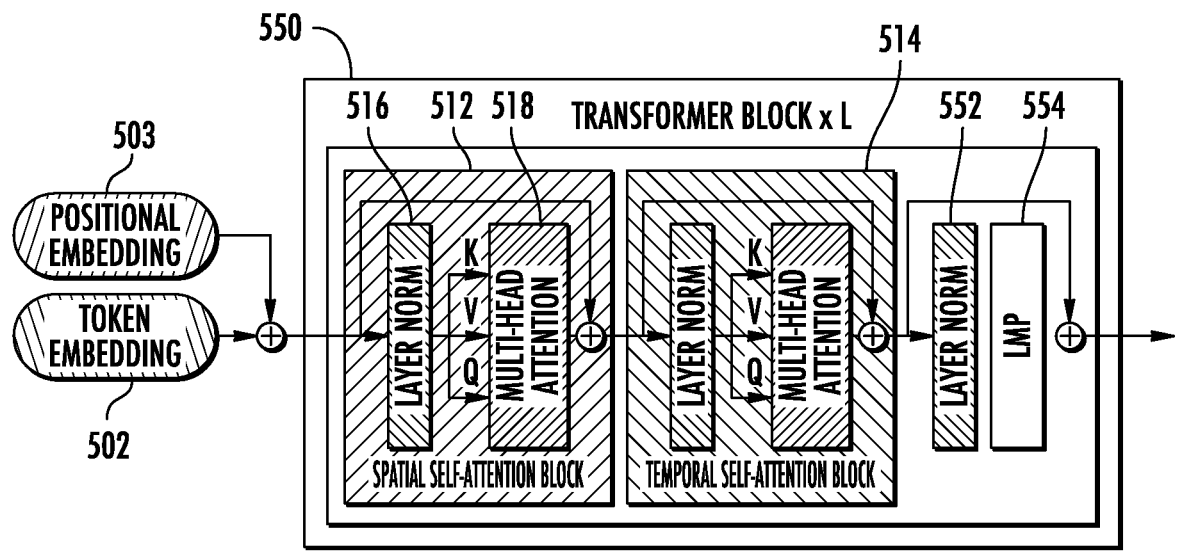
FIG. 5B depicts a block diagram of an example factorized self-attention mechanism in an example transformer block according to example embodiments of the present disclosure.

FIG. 5B depicts a block diagram of an example factorized self-attention mechanism in an example transformer block 550 according to example embodiments of the present disclosure. As illustrated in FIG. 5B, the transformer block 550 can take as input tokens 502 (e.g., including positional embedding 503). The transformer block 550 can include a spatial self-attention block 512 and a temporal self-attention block 514. Additionally, the transformer block 550 can include a normalization layer 552 feeding a multi-layer perceptron layer 554. The spatial self-attention block 512 and the temporal self-attention block 514 can each include a normalization layer 516 and a multi-head attention mechanism 518.

Figure 6:
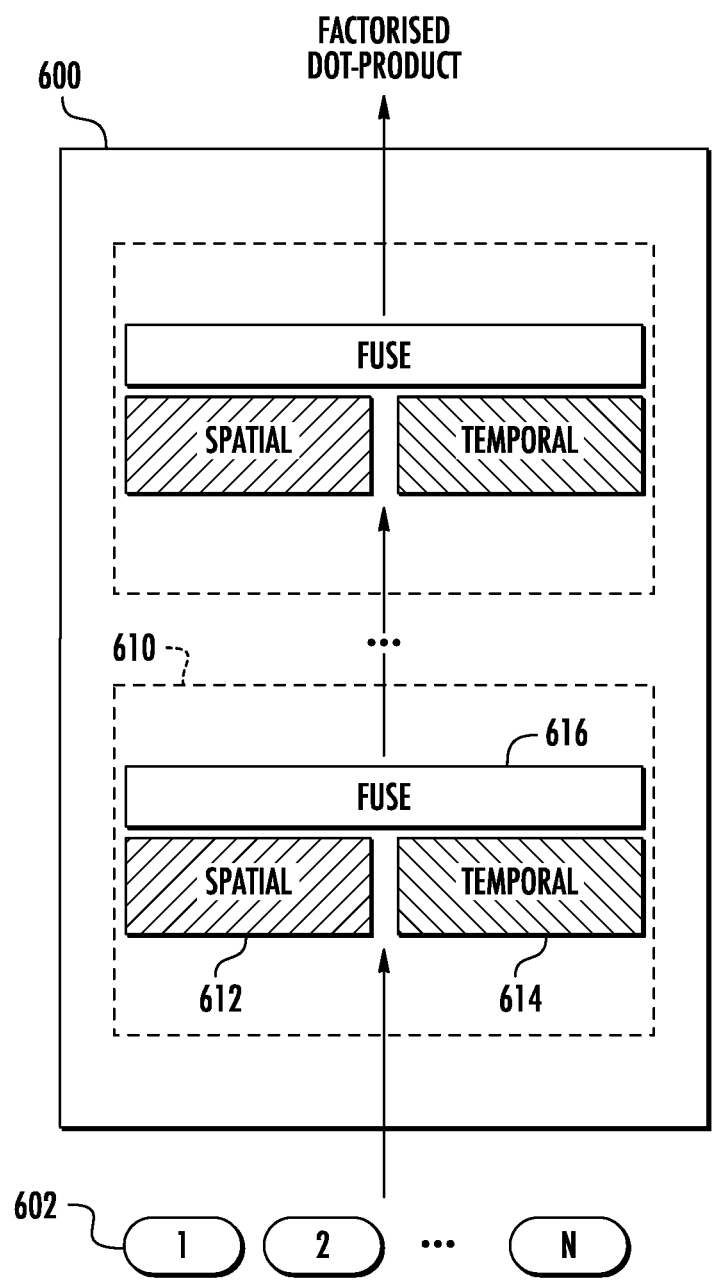
FIG. 6 depicts a block diagram of an example factorized dot-product attention mechanism according to example embodiments of the present disclosure.

FIG. 6 depicts a block diagram of an example factorized dot-product attention mechanism 600 according to example embodiments of the present disclosure. The factorized dot-product attention mechanism 600 can include a plurality of layers 610. Each layer 610 can include a plurality of spatial attention heads 612 configured to compute attention weights for each of the plurality of video tokens 602 over a spatial dimension and a plurality of temporal attention heads 614 configured to compute attention weights for each of the plurality of video tokens 602 over a temporal dimension. In addition, each layer can include a fusion mechanism 616 configured to fuse the output from the spatial attention heads 612 and the temporal attention heads 614. For instance, in some implementations, outputs from the plurality of spatial attention heads 612 and the plurality of temporal attention heads 614 are combined by concatenation and linear projection. Factorized dot-product attention factories the multi-head dot-product attention operation within the transformer. As a result, the attention neighborhood for each token 602 is modified to only attend over spatial dimensions and temporal dimensions separately. For instance, the keys and values for each query can be modified to attend over tokens 602 from the same spatial and/or temporal index.

Figure 7:
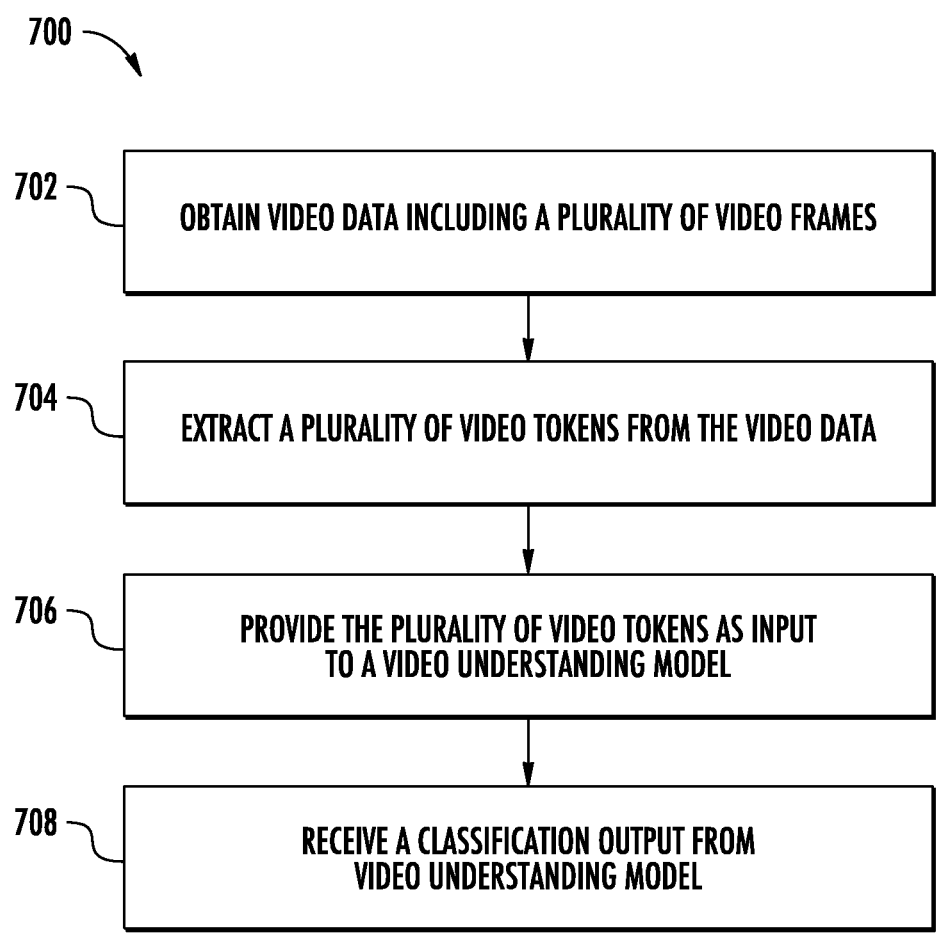
FIG. 7 depicts a flow chart diagram of an example method for classifying video data with improved accuracy according to example embodiments of the present disclosure.

FIG. 7 depicts a flow chart diagram of an example method 700 for classifying video data with improved accuracy according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

The method 700 can include, at 702, obtaining (e.g., by a computing system comprising one or more computing devices, video data. The video data can include a plurality of image frames. The image frames can depict one or more objects. For example, the video data can be a video captured by a mobile device, video camera, or any other suitable video capturing device. The video data can be stored in any suitable manner. For instance, the video data can be stored in computer-readable memory in any suitable format, such as a digital file format (e.g., a .mp4 file format, a .wav file format, etc.). Consider a video $V \in \mathbb{R}^{T \times H \times W \times C}$. For instance, in some implementations, the video data can include a number of image frames (e.g., T), a height (e.g., H), a width (e.g., W), and/or a number of channels (e.g., C). As an example, in some implementations, the video data can include 3 channels, such as a red channel, a green channel, a blue channel, and/or other color channels.

The method 700 can include, at 704, extracting (e.g., by the computing system) a plurality of video tokens from the video data. The video tokens can be a representation (e.g., an embedding representation) of spatiotemporal information of the video data. In some implementations, the plurality of video tokens are single-dimensional. The video tokens (e.g., the tubelets) may span a single frame t and/or a plurality of frames t. The video tokens (e.g., the tubelets) may be extracted from non-overlapping video data. For instance, a given portion of video data (e.g., a given pixel) may be represented exactly once in the plurality of video tokens (e.g., the tubelets). Additionally and/or alternatively, the video tokens (e.g., the tubelets) may span an entirety of the video data, such as the entire spatiotemporal volume defined by the video data. Processing a video can involve a large number of extracted tokens. Video understanding models according to example aspects of the present disclosure can be designed to process these video tokens, including a large number of video tokens.

For instance, in some implementations, the video tokens can be formed from "tubelets" having a length (e.g., l) and width (e.g., w) and spanning a number of video frames (e.g., t) that are then projected into a tensor representation (e.g., a d-dimensional vector). For instance, in some implementations, extracting the plurality of video tokens can include extracting (e.g., by the computing system) a plurality of video tubelets from the video data. According to example aspects of the present disclosure, N (e.g., non-overlapping) tubelets, $x_i \in \mathbb{R}^{t \times h \times w}$ can be extracted from the video data. Intuitively, this approach fuses spatiotemporal information during tokenization, which can be beneficial for improving video understanding.

For instance, the computing system can extract a plurality of tokens $\tilde{z} \in \mathbb{R}^{n_t \times n_h \times n_w \times d}$ from tubelets of the video $V \in \mathbb{R}^{T \times H \times W \times C}$, where $n_s$ among dimension s is the number of tokens along the dimension (e.g., $$\left(e.g., \text{floor}\left(\frac{T}{t}\right), \text{floor}\left(\frac{H}{h}\right), \text{floor}\left(\frac{W}{w}\right)\right).$$

In some implementations, the plurality of video tubelets are nonoverlapping. In some implementations, each of the plurality of video tubelets spans one of the plurality of video frames. In some implementations, each of the plurality of video tubelets spans two or more of the plurality of video frames. Furthermore, in some implementations, a length and/or width of the tubelets may be equivalent to and/or less than a length and/or width of the video data. For instance, in some implementations, a tubelet may be or may include a single (e.g., entire) frame. Smaller tubelets can result in more tokens, which can thus increase computational cost of processing the tokens. However, systems and methods described herein can nonetheless be capable of processing the tokens.

Additionally and/or alternatively, extracting the plurality of video tokens can include projecting, by the computing system, the plurality of video tubelets to a plurality of tensor representations of the plurality of video tubelets. As an example, the plurality of tubelets can be projected by linear projection (e.g., into an array or matrix). For instance, an array of tubelets having size $$\text{floor}\left(\frac{T}{t}\right) \times \text{floor}\left(\frac{H}{h}\right) \times \text{floor}\left(\frac{W}{w}\right)$$

can be extracted from the video data.

Additionally and/or alternatively, extracting the plurality of video tokens can include merging (e.g., by the computing system) the plurality of tensor representations along at least one dimension to produce the plurality of video tokens. For instance, the array of tubelets can be compressed into a sequence of d-dimensional token representations by merging spatiotemporal dimensions. As one example, the tokens can be ordered in a single dimension based on frame index and/or position within the frame. This sequence of spatiotemporal tokens can then be passed through the video understanding model.

In some implementations, positional embeddings can be added to the sequence of tokens. As an example, in some implementations, positional embeddings are added to the plurality of video tokens and (e.g., subsequently) input to the video understanding model. For instance, this can assist permutation invariant models (e.g., transformers) with spatiotemporal understanding. As an example, once the positional embeddings are added, in some implementations, the tokens can be reshaped to obtain the input to the video understanding model.

The method 700 can include, at 706, providing (e.g., by the computing system) the plurality of video tokens to the video understanding model. The video understanding model can include a video transformer encoder model. The transformer encoder model can include an attention mechanism (e.g., a self-attention mechanism), at least one normalization layer and/or at least one multi-layer perceptron layer.

In some implementations, the video understanding model can process the entire sequence of tokens directly. For instance, in some implementations, the video understanding model includes a (e.g., nonfactorized) attention mechanism (e.g., self-attention mechanism), a normalization layer, and a multi-layer perceptron layer. The sequence of tokens (e.g., and/or position embedding(s), classification (CLS) token(s), etc.) can be input directly to this model. The video understanding model can thus model pairwise interactions between all pairs of spatiotemporal tokens in the input sequence. This approach can be computationally expensive, but achieves improved results on large datasets with ample training data. The parameters of this model can be initialized from an image-pretrained model for faster training and higher accuracy.

In some implementations, the video understanding model can include a factorized encoder. The factorized encoder can include two separate subencoders (e.g., transformers) in series. The factorized encoder can include, for instance, a spatial transformer encoder and a temporal transformer encoder. The spatial transformer encoder can be configured to receive the plurality of video tokens and produce, in response to receipt of the plurality of video tokens, a plurality of temporal representations. The temporal transformer encoder can be configured to receive the plurality of temporal representations and produce, in response to receipt of the plurality of temporal representations, a spatiotemporal representation of the video data, wherein the spatiotemporal representation is classified to produce the classification output. For instance, the first subencoder, referred to as the spatial encoder, models interactions between tokens extracted from the same temporal index. A token representation for each temporal index (e.g., frame) is obtained from the first subencoder. For instance, a representation for each temporal index, $h_i \in \mathbb{R}^d$, can be obtained from the spatial encoder (e.g., after $L_s$ layers). If prepended to the input, this can be equivalent to a classification token. Otherwise, this can be a global average pooling from the tokens output by the spatial encoder. The representations across different temporal indices can be aggregated into a single vector. The temporal representations $h_i$ can be concatenated into a vector $H \in \mathbb{R}^{n_t \times d}$.

Thereafter, a second subencoder, referred to as the temporal encoder, models interactions between these tokens. For instance, the vector can be forwarded through the temporal encoder (e.g., including $L_t$ layers) to model interactions between tokens from different temporal indices. The output from the temporal encoder can then be classified (e.g., by a classification model, such as a multi-layer perceptron model) In some implementations, the parameters of the spatial encoder can be initialized from an image-pretrained model for faster training. This model can be significantly faster than other models (e.g., processing all tokens directly) especially as the sequence length of tokens increases, as it does not compute pairwise interactions between all input tokens. For instance, compared to the model that operates on all tokens directly, the factorized encoder can include a greater number of transformer layers, but require fewer floating point operations (FLOPs) to compute.

Additionally and/or alternatively, in some implementations, the video understanding model can include factorized self-attention. The factorized self-attention mechanism can include a first self-attention block configured to compute spatial self-attention among the plurality of video tokens from a same temporal index and a second self-attention block configured to compute temporal self-attention among the plurality of video tokens from a same spatial index. These computations may be performed sequentially in either order and/or in parallel. Factorized self-attention decomposes the multi-headed self-attention operation within a Transformer layer such that, at first, self-attention is only computed spatially. Thereafter, self-attention is only computed temporally. This can model spatiotemporal interactions more efficiently by factorizing the operation over two smaller sets of elements with comparable computational complexity.

In some implementations, the plurality of video tokens are reshaped prior to being input to the factorized self-attention mechanism. For instance, the tokens can be reshaped from $\mathbb{R}^{1 \times n_t \cdot n_h \cdot n_w \cdot d}$ to $\mathbb{R}^{n_t \times n_h \cdot n_w \cdot d}$. Reshaping the tokens can provide for more efficient computation.

The parameters of the spatial transformer can be initialized from an image-pretrained model. Additionally and/or alternatively, the parameters of the temporal transformer can be initialized as a vector of zeros. This can accelerate training and/or improve overall model performance. The factorized self-attention mechanism can include the same number of transformer layers as the model that operates on all tokens. However, the number of parameters does increase due to the additional self-attention layer. In some implementations, a classification token is not used as part of the input in this model to avoid ambiguities when reshaping the input tokens between spatial and temporal dimensions.

Additionally and/or alternatively, in some implementations, the video understanding model can include factorized dot-product attention. The factorized dot-product attention mechanism can include a plurality of spatial attention heads configured to compute attention weights for each of the plurality of video tokens over a spatial dimension and a plurality of temporal attention heads configured to compute attention weights for each of the plurality of video tokens over a temporal dimension. Factorized dot-product attention factories the multi-head dot-product attention operation within the transformer. As a result, the attention neighborhood for each token is modified to only attend over spatial dimensions and temporal dimensions separately. For instance, the keys and values for each query can be modified to attend over tokens from the same spatial and/or temporal index. A first half of attention heads can attend over tokens from the spatial dimensions and a second half of attention heads can attend over the temporal dimension. In some implementations, outputs from the plurality of spatial attention heads and the plurality of temporal attention heads are combined by concatenation and linear projection.

In some implementations, this model may not add any parameters compared to an image-pretrained model, and thus can be initialized directly from it. The factorized dot-product attention can provide a comparable number of parameters to the model that operates directly on all tokens while having comparable computational complexity to the factorized self-attention and factorized encoder. Note that these embodiments are not mutually exclusive, and a given video understanding model may include none or any other combination of a factorized encoder, factorized self-attention and/or factorized dot-product attention.

The method 700 can include, at 708, receiving (e.g., by the computing system) a video understanding output from the video understanding model. For instance, in some implementations, the video understanding output can be a video classification output. The video classification output can include data indicative of the video data belonging to at least one class of a plurality of candidate classes. For instance, in some implementations, the video understanding model can output, as the video classification output, a plurality of logit scores respectively associated with the plurality of candidate classes. The logit scores can be indicative of a likelihood, probability, confidence, etc. that the video data belongs to the respective candidate class.

In some implementations, the classification output can be averaged across multiple sets of video data to achieve a final classification output. For instance, in some implementations, longer video segments can be split into multiple views, and each view can be separately input into the video understanding model. The output (e.g., logits) per view can be averaged together to produce a final output for the longer video segments. For instance, the classification output can include, for each candidate class of the plurality of candidate classes, a logit score respectively associated with the candidate class, where the logit score is indicative of a probability or confidence that the video segment described by the video data is properly classified by the candidate class. In some implementations, the logit scores can be one-hot such that, for a given classification output, a single logit score may be nonzero, with all other logit scores having zero values. In some implementations, the logit scores may be discrete values (e.g., 0 or 1). In some implementations, the logit scores may range from a minimum value (e.g., 0) to a maximum value (e.g., 1).

Additionally and/or alternatively the classification output may be or include a word or phrase descriptive of at least a portion of a video segment described by the video data. For instance, in some implementations, the classification output can be a phrase of one or more words that is descriptive of a subject of the video segment, such as object(s) depicted in the video segment, action(s) performed or described in the video segment, topic(s) included in the video segment, and/or other suitable subjects. As an example, in some implementations, the word or phrase can be output directly from the video classification model. As another example, in some implementations, each candidate class of the plurality of candidate classes (e.g., each logit score) can have a respectively associated word or phrase.

Figure 8:
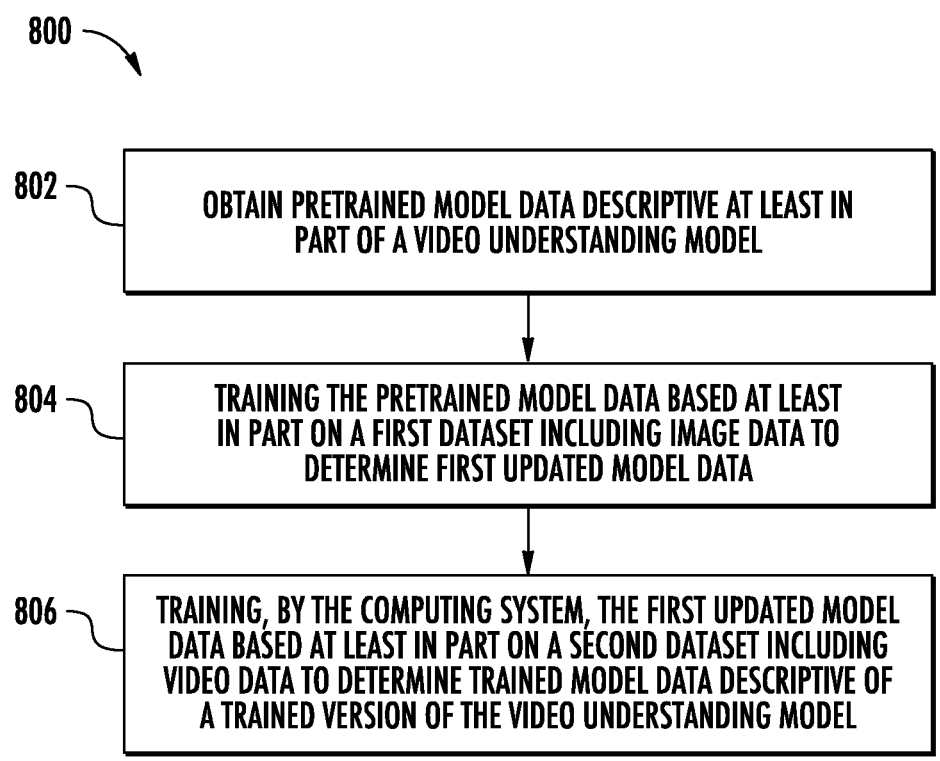
FIG. 8 depicts a flow chart diagram of an example method for training a video understanding model for classifying video data with improved accuracy according to example embodiments of the present disclosure.

FIG. 8 depicts a flow chart diagram of an example method 800 for training a video understanding model for classifying video data with improved accuracy according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

The method 800 can include, at 802, obtaining (e.g., by a computing system comprising a plurality of computing devices) pretrained model data descriptive at least in part of a video understanding model. The video understanding model can include at least one parameter of a video transformer encoder model. For instance, the pretrained model data may be descriptive of an image understanding model (e.g., an image classification model) that may be at least partially repurposed (e.g., may have at least one directly transferable parameter) such that the model can be converted to a video understanding model according to example aspects of the present disclosure.

The method 800 can include, at 804, training (e.g., by the computing system) the pretrained model data based at least in part on a first dataset, the first dataset comprising image data, to determine first updated model data. For instance, the first dataset can be an image dataset. The model can be trained using the first dataset. Generally, image datasets are more widely available than video datasets, and can be useful in partially training a video understanding model.

The method 800 can include, at 806, training (e.g., by the computing system) the first updated model data based at least in part on a second dataset, the second dataset comprising video data, to determine trained model data descriptive of a trained version of the video understanding model. For instance, the second dataset can be a video dataset. The second dataset may have comparatively smaller amounts of training data (albeit more closely related to the video classification task) than the first dataset, such as due to a lack of available training data (e.g., for the video classification task). Subsequent to being trained using the first dataset, the model can be trained using the second dataset.

For instance, one challenge present in the use of video data with machine-learned (e.g., transformer-based) model architectures is that many architectures can require large corpuses of training data to effectively train the model(s). For instance, many architectures operating on image data can be trained using large datasets such as ImageNet 21K, HT, etc. such that the model(s) can be trained to an acceptable degree. However, generation of video datasets at this scale can be costly, and, as such, comparably-sized datasets generally do not exist for video data. For some machine-learned model architectures, especially those having inductive biases (e.g., convolutional models), this challenge may not be detrimental to use of the model. For some models lacking inductive biases (e.g., transformer models), this can complicate use of the model unless a sufficiently sized dataset is available. For instance, transformer models may only provide effective predictions when trained on large-scale datasets. Currently, even the largest video datasets such as Kinetics have several orders of magnitude fewer labeled examples than corresponding image datasets. As a result, training large models from scratch to high accuracy can be prohibitively challenging. To solve this problem, example aspects of the present disclosure provide for initializing the models described herein from pretrained image models. Example aspects of the present disclosure are directed to effective strategies for leveraging pretrained image models to initialize large-scale video understanding models, such as on how to initialize parameters that may be incompatible with image models.

For instance, in some implementations, a position embedding is added to each input token. However, video models can have many more tokens (e.g., $n_t$ times more tokens) than image models (e.g., from having t frames). As a result, to initialize the positional embedding, it can be beneficial to repeat the token temporally over each frame. Therefore, at initialization, all tokens with the same spatial index can have the same embedding, which can then be fine-tuned.

As another example, in some implementations, the tubelet embedding filter may be a three-dimensional tensor compared to a two-dimensional tensor in an image model (e.g., due to the temporal dimension). One approach to initialize the three-dimensional filter from the two-dimensional filter is to inflate it by replicating the filter along the temporal dimension and averaging them. Another approach, termed "central frame initialization", includes initializing the filter with zeroes along all temporal positions except at the temporal center. In this case, the filter can effectively behave like frame sampling at initialization while still having the capability to learn to aggregate temporal information from multiple frames as training progresses.

As another example, in some implementations, the factorized self-attention transformer block can include two multi-headed self-attention (MSA) modules, where a standard image model may include only one MSA module. Thus, in some implementations, the spatial self-attention model can be initialized from the pretrained module and the temporal self-attention model can be initialized with zeroes. In this case, the model behaves as a residual connection at initialization.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for classifying video data with improved accuracy, the method comprising:
   obtaining, by a computing system comprising one or more computing devices, video data comprising a plurality of video frames;
   extracting, by the computing system, a plurality of video tokens from the video data, the plurality of video tokens comprising a representation of spatiotemporal information in the video data,
   wherein extracting the plurality of video tokens from the video data comprises:
      extracting, by the computing system, a plurality of video tubelets from the video data, the plurality of video tubelets respectively comprising a length and a width and spanning two or more video frames of the plurality of video frames;
      projecting, by the computing system, the plurality of video tubelets to a plurality of tensor representations of the plurality of video tubelets; and
      merging, by the computing system, the plurality of tensor representations along at least one dimension to produce the plurality of video tokens;
   providing, by the computing system, the plurality of video tokens as input to a video understanding model, the video understanding model comprising a video transformer encoder model; and
   receiving, by the computing system, a classification output from the video understanding model.

2. The computer-implemented method of claim 1, wherein the video transformer encoder comprises a factorized encoder, the factorized encoder comprising a spatial transformer encoder and a temporal transformer encoder.

3. The computer-implemented method of claim 2, wherein the spatial transformer encoder is configured to receive the plurality of video tokens and produce, in response to receipt of the plurality of video tokens, a plurality of temporal representations; and wherein the temporal transformer encoder is configured to receive the plurality of temporal representations and produce, in response to receipt of the plurality of temporal representations, a spatiotemporal representation of the video data, wherein the spatiotemporal representation is classified to produce the classification output.

4. The computer-implemented method of claim 1, wherein the video transformer encoder model comprises a factorized self-attention mechanism, wherein the factorized self-attention mechanism comprises a first self-attention block configured to compute spatial self-attention among the plurality of video tokens from a same temporal index and a second self-attention block configured to compute temporal self-attention among the plurality of video tokens from a same spatial index.

5. The computer-implemented method of claim 4, wherein the plurality of video tokens are reshaped prior to being input to the factorized self-attention mechanism.

6. The computer-implemented method of claim 1, wherein the video transformer encoder model comprises a factorized dot-product attention mechanism, the factorized dot-product attention mechanism comprising a plurality of spatial attention heads configured to compute attention weights for each of the plurality of video tokens over a spatial dimension and a plurality of temporal attention heads configured to compute attention weights for each of the plurality of video tokens over a temporal dimension.

7. The computer-implemented method of claim 6, wherein outputs from the plurality of spatial attention heads and the plurality of temporal attention heads are combined by concatenation and linear projection.

8. The computer-implemented method of claim 1, wherein the plurality of video tokens are single-dimensional.

9. The computer-implemented method of claim 1, wherein the plurality of video tubelets are nonoverlapping.

10. The computer-implemented method of claim 1, wherein positional embeddings are added to the plurality of video tokens and input to the video understanding model.

11. The computer-implemented method of claim 1, wherein the transformer encoder model comprises at least one normalization layer.

12. The computer-implemented method of claim 1, wherein the transformer encoder model comprises at least one multi-layer perceptron layer.

13. A computing system configured for classifying video data with improved accuracy, the computing system comprising:
   one or more processors; and
   one or more memory devices storing:
      a video understanding model comprising a video transformer encoder model; and
      one or more operations that, when implemented by the one or more processors, cause the one or more processors to perform operations, the operations comprising:
         obtaining video data comprising a plurality of video frames;
         extracting a plurality of video tokens from the video data, the plurality of video tokens comprising a representation of spatiotemporal information in the video data,
         wherein extracting the plurality of video tokens from the video data comprises:
            extracting, by the computing system, a plurality of video tubelets from the video data, the plurality of video tubelets respectively comprising a length and a width and spanning two or more video frames of the plurality of video frames;

projecting, by the computing system, the plurality of video tubelets to a plurality of tensor representations of the plurality of video tubelets; and merging, by the computing system, the plurality of tensor representations along at least one dimension to produce the plurality of video tokens;

providing the plurality of video tokens as input to a video understanding model, the video understanding model comprising a video transformer encoder model; and receiving a classification output from the video understanding model.

14. The computing system of claim 13, wherein the video transformer encoder comprises a factorized encoder, the factorized encoder comprising a spatial transformer encoder and a temporal transformer encoder, wherein the spatial transformer encoder is configured to receive the plurality of video tokens and produce, in response to receipt of the plurality of video tokens, a plurality of temporal representations; and wherein the temporal transformer encoder is configured to receive the plurality of temporal representations and produce, in response to receipt of the plurality of temporal representations, a spatiotemporal representation of the video data, wherein the spatiotemporal representation is classified to produce the classification output.

15. The computing system of claim 13, wherein the video transformer encoder model comprises a factorized self-attention mechanism, wherein the factorized self-attention mechanism comprises a first self-attention block configured to compute spatial self-attention among the plurality of video tokens from a same temporal index and a second self-attention block configured to compute temporal self-attention among the plurality of video tokens from a same spatial index.

16. The computing system of claim 13, wherein the video transformer encoder model comprises a factorized dot-product attention mechanism, the factorized dot-product attention mechanism comprising a plurality of spatial attention heads configured to compute attention weights for each of the plurality of video tokens over a spatial dimension and a plurality of temporal attention heads configured to compute attention weights for each of the plurality of video tokens over a temporal dimension.

* * * * *